United States Patent
Ouchi et al.

(10) Patent No.: US 6,852,968 B1
(45) Date of Patent: Feb. 8, 2005

(54) SURFACE-TYPE OPTICAL APPARATUS

(75) Inventors: Toshihiko Ouchi, Sagamihara (JP); Yasuhiro Shimada, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/519,672

(22) Filed: Mar. 6, 2000

(30) Foreign Application Priority Data

| Mar. 8, 1999 | (JP) | ............................................ 11/059533 |
| Mar. 8, 1999 | (JP) | ............................................ 11/059535 |
| Mar. 8, 1999 | (JP) | ............................................ 11/059541 |

(51) Int. Cl.[7] .................................................. H01J 3/14
(52) U.S. Cl. ...................... 250/234; 250/201.3; 250/306
(58) Field of Search .......................... 250/201.3, 214.1, 250/234, 239, 306, 307; 257/80, 81, 82, 98, 99

(56) References Cited

U.S. PATENT DOCUMENTS

| 5,068,868 A | * | 11/1991 | Deppe et al. .................. 257/11 |
| 5,115,441 A | * | 5/1992 | Kopf et al. .................... 372/45 |
| 5,212,706 A | * | 5/1993 | Jain ............................. 372/23 |
| 5,294,790 A | * | 3/1994 | Ohta et al. .................... 250/216 |
| 5,489,774 A | * | 2/1996 | Akamine et al. ............. 250/234 |
| 5,666,190 A | * | 9/1997 | Quate et al. .................. 250/234 |
| 5,770,856 A | * | 6/1998 | Fillard et al. ................. 250/234 |
| 5,825,789 A | * | 10/1998 | Watanabe et al. ............. 372/21 |
| 5,912,913 A | * | 6/1999 | Kondow et al. ............... 372/45 |
| 5,969,821 A | * | 10/1999 | Muramatsu et al. ......... 356/613 |
| 6,091,084 A | * | 7/2000 | Fujii ............................ 257/82 |
| 6,201,226 B1 | * | 3/2001 | Shimada et al. ......... 250/201.3 |
| 6,333,497 B2 | * | 12/2001 | Shimada et al. ......... 250/201.3 |
| 6,376,833 B2 | * | 4/2002 | Shimada et al. .............. 216/11 |
| 6,408,122 B1 | * | 6/2002 | Shimada et al. ............. 250/306 |
| 6,408,123 B1 | * | 6/2002 | Kuroda et al. .............. 359/368 |

FOREIGN PATENT DOCUMENTS

| JP | 5-100168 | 4/1993 |
| JP | 8-306062 | 11/1996 |

OTHER PUBLICATIONS

U. Dürig et al., "Near–field optical–scanning microscopy", J. Appl. Phys. 59 (10) May 1986, pp. 3318–3327.

* cited by examiner

Primary Examiner—Edward J. Glick
Assistant Examiner—Courtney Thomas
(74) Attorney, Agent, or Firm—Fitzpatrick, Cella, Harper & Scinto

(57) ABSTRACT

A surface optical apparatus that includes a surface optical device with p-side and n-side electrodes, such as a surface emitting laser, a first substrate for supporting the surface optical device directly or through an elastic supporter formed of one or plural layers, and a first electrode wiring of at least a wire formed on the first substrate and electrically connected to one of the electrodes. A current is injected into or a voltage is applied across the surface optical device through the first electrode wiring and the p-side and n-side electrodes. A photodetector for detecting light from the surface optical device may also be arranged in the vicinity of the optical device.

16 Claims, 26 Drawing Sheets

SURFACE-TYPE OPTICAL APPARATUS

BACKGROUND OF THE INVENTION

1. Field of the Invention

This invention relates to a surface-type optical apparatus, such as a light source apparatus for emitting evanescent light or the like, suitable for use in a so-called near-field optical microscope, and an information recording or optical exposure apparatus using a near-field optical system, its fabrication method, and its use method of use as an optical information recording apparatus, an optical exposure apparatus or the like.

2. Related Background Art

Recently, the development of optical techniques using evanescent light from a minute opening of less than about 100 nm formed at a sharp probe tip has been energetically advanced. Such optical techniques include high resolving-power observation, high-density information recording, super-fine optical exposure and the like utilizing the near-field optical system. Regarding the high resolving-power observation, During et al., *J. Appl. Phys.*, vol. 59, 3318 (1986) discloses a scanning near-field optical microscope (SNOM) for investigating a sample surface by detecting the condition of the sample surface with an optical probe. Further, Japanese Patent Application Laid-Open No. 5 (1993)- 100168 discloses an apparatus for introducing light into the SNOM.

In this apparatus, as illustrated in FIGS. 1 and 2, a minute opening 610 is formed at a tip of a conical member mounted on an Si substrate 601, an aperture portion 602 is formed in the Si substrate 601, and an optical fiber 603 is inserted into the aperture portion 602 to emit light through the fiber 603. There are also provided an electrode 607, a light waveguide layer 608, a metal layer 609 and an antireflection layer 611.

Further, there has been proposed a structure, as illustrated in FIG. 3, wherein a minute opening 813 is formed in an electrode 811 on the light emitting end surface of a surface emitting laser. The surface emitting laser includes a laser substrate 801, a buffer layer 802, a semiconductor multi-layer mirror 803, current-constricting semiconductor layers 804, 808 and 809, an active layer 805, a cladding layer 806, a contact layer 807, an insulating layer 810, and another laser electrode 812. In this structure, another optical system needs to be arranged for a photodetector for observing a sample image or reading optical information.

Furthermore, Japanese Patent Application Laid-Open No. 8 (1996)-306062 discloses a structure, as illustrated in FIG. 4, wherein an elliptically-conical probe 903 is provided on one end facet of an end-facet emitting semiconductor laser 901. The probe 903 is covered with a Pt electrode 910, and a member with a minute opening for generating evanescent light 904 is formed at a tip of the electrode 910. This structure further includes a photodetector 902, and a floating slider 906, and an optically-recorded region 909 is formed in an optical recording medium. In this structure, the photodetector 902 is mounted on the other end facet of the laser 901 to detect its light output. Thus, the light introducing apparatus and the signal reading apparatus are provided in one optical system, and a compact optical head for reading optical information is achieved.

In the near-field optical system, a high efficiency of the light source is required, since evanescent light leaks slightly from the minute opening. Therefore, a semiconductor laser with a low threshold and a high quantum efficiency is needed. The structure illustrated in FIGS. 1 and 2, however, is undesirable, because light is guided through the optical fiber 603 and hence coupling loss is likely to occur. Further, the SNOM head with the end-facet emitting laser 901, as illustrated in FIG. 4, is unsuitable for multiple arraying since its operational current and consumption electric power are large.

Furthermore, in the near-field optical system, its probe needs to be supported by a certain elastic or resilient body because the probe must be scanned in such a manner that the probe is almost in contact with the medium (its gap is about the size of the minute opening, i.e., about 100 nm) having an uneven surface. Where a high-speed scanning is required, it is desirable to array the SNOM heads and perform a simultaneous scanning with multiple probes. In such a structure, the medium surface or the probe tip is likely to be damaged unless the SNOM heads are supported by different elastic bodies to scan the medium surface while each probe tip precisely follows and traces the surface.

In the case of the SNOM head, as illustrated in FIGS. 1, 2 and 3, the heads will probably be formed on a common substrate when the array is constructed. In such a structure, respective minute openings are present on a common plane, so that highly precise scanning of the medium surface is not possible. Therefore, another optical system for optical detection is needed, so the apparatus becomes large in size. Particularly where the arraying of the heads is to be designed, a preferable S/N of a detected signal is difficult to obtain due to the light interference and a relatively long distance between an observation point and a detecting system.

However, in the case where a plurality of the end-facet emitting lasers, as illustrated in FIG. 4, are arrayed, a plurality of supporting elastic bodies are needed. Therefore, the entire apparatus of the SNOM heads becomes large in size and heavy in weight, and hence a high-speed scanning is difficult to achieve.

SUMMARY OF THE INVENTION

It is an object of the present invention to provide a surface-type optical apparatus, such as a compact light source apparatus for emitting evanescent light or the like suitable for use in a near-field optical system, and an information recording or optical exposure apparatus using a near-field optical system, its fabrication method, and method of its use as an optical information recording apparatus, an optical exposure apparatus or the like.

The present invention is generally directed to a surface-type optical apparatus, which includes a surface-type optical device, such as a surface emitting laser and a surface-type photodiode, with p-side and n-side electrodes; a first substrate for supporting the surface-type optical device; and a first electrode wiring-comprising of at least a wire formed on the first substrate and electrically connected to either of the electrodes. In this structure, a current can be injected into or a voltage can be applied across the surface-type optical device through the first electrode wiring and the p-side and n-side electrodes.

The following more specific constructions are possible on the basis of the above fundamental structure. The phrases "surface-type" and "surface" are interchangeably employed herein and have identical meanings.

The surface-type optical device may include a member with a minute (i.e. about 100 nm) opening for passing light therethrough.

The minute opening is typically formed such that evanescent light is generated thereby. The minute opening is formed in a minute protrusion member, such as a tetrahedral metal member with an opening on its tip, provided at a light passing portion of the surface-type optical device, for example. When such a surface-type optical device is provided on a supporter, a highly-effective; light SNOM head, or the like, with little coupling loss can be achieved.

The surface-type optical device may be supported by the first substrate through an elastic supporter, and the first electrode wiring is formed on the first substrate and the elastic supporter. When the surface-type optical device is mounted on the elastic supporter, such as a thin-layer elastic supporter, a medium surface can be rapidly scanned without damages to the optical device and the medium surface. Further, arrayed SNOM heads or the like can be mounted on a common substrate through a single or plural elastic supporters.

The first substrate may be an Si substrate with an $SiN_x$ thin layer formed thereon, and the elastic supporter may be formed of a portion of the SiN, thin layer under which the Si substrate is removed. Thus, a compact elastic supporter, such as a cantilever-type thin-layer elastic supporter, can be readily fabricated.

The first substrate may be an Si substrate with an $SiO_2$ thin layer and an Si thin layer formed thereon in this order (i.e., a semiconductor on insulator or silicon on insulator (SOI)), and the elastic supporter may be composed of a portion of the Si thin layer under which the Si substrate and the $SiO_2$ thin layer are removed.

Thus, a strong compact elastic supporter, such as a cantilever-type thin-layer elastic supporter, can be readily fabricated.

The wire may be a portion formed by doping the Si thin layer of the SOI in a predetermined pattern. Where the elastic supporter of the Si thin layer is used, a portion of the Si thin layer can be used as the wire when the conductivity of the portion is increased by doping of the Si using an ion implantation or the like.

A plurality of the surface-type optical devices may be arranged on the elastic supporter. For example, when plural surface-type devices, each with a minute opening, are mounted on a single elastic supporter, the devices can be arranged with a high density and used simultaneously for various tasks, such as tracking and optical detection. Thus, a multi-SNOM head for a high-speed scanning or the like can be realized.

The elastic supporter may be shaped into a cantilever, such as a trapezoidal cantilever, whose central portion is removed, and the surface-type optical device may be placed on a tip of the cantilever.

The surface-type optical device may be a surface emitting semiconductor laser. When the surface emitting laser with a minute opening on its light emission surface is used in an SNOM head or the like, increasing the intensity of evanescent light.

The surface-type optical device may include thin semiconductor layers grown on a second substrate, which may be different from the first substrate. The second substrate may be mounted on the first substrate or an elastic supporter supported by the first substrate.

The surface-type optical device may include thin semiconductor layers with a functional portion, which is fabricated by growing the thin semiconductor layers on a second substrate, and the functional portion without the second substrate may be mounted on the first substrate or an elastic supporter supported by the first substrate. Since the second substrate is removed after the optical device is bonded on a thin-layer elastic supporter or the like, the apparatus such as an SNOM head can be made compact in size and light in weight. Therefore, the heads or the like can be readily arrayed at a high density.

The first electrode wiring may include two wires connected to the p-side and n-side electrodes of the surface-type optical device, respectively. This structure can be fabricated by forming two electric-wire patterns on a thin-layer elastic supporter or the like.

An insulating portion may be-formed on an end face of the surface-type optical device to smooth a step at the end face, and one of the two wires is electrically connected to one of the two electrodes of the optical device on a side of the first substrate while the other of the two wires is laid over the insulating portion and electrically connected to the other electrode on an upper surface of the optical device.

The p-side and n-side electrodes of the surface-type optical device may be formed on the same side of the optical device, and the two wires are electrically connected to the two electrodes, respectively.

A plurality of the surface-type optical devices may be arranged on the first substrate, or on a plurality of elastic supporters commonly supported by the first substrate, respectively. For example, when plural SNOM heads are arrayed on a common substrate and the substrate is removed in a lattice pattern, a light source apparatus for a near-field optical system with optical devices arranged with a high density can be readily fabricated.

In the above structures, the surface-type optical device may be a surface-type light emitting device. The surface-type light emitting device may be supported by the first substrate through an elastic supporter. The first electrode wiring may be formed on the first substrate and the elastic supporter. A photodetector with a p-side electrode and an n-side electrode to detect output light of the light emitting device may be further arranged, and the photodetector may be positioned in the vicinity of the light emitting device. According to this structure, a light introducing device for a near-field optical system and a photodetector can be integrally arranged in a compact apparatus.

In the structure including the photodetector, the first substrate may be a substrate with a metal thin layer formed thereon, and the elastic supporter may be made of a portion of the metal thin layer under which the substrate is removed.

The photodetector may be a photodiode (PD) or a field effect transistor (FET) integrally formed at a position on the elastic supporter of an Si thin layer, at which the photodetector can detect output light of the surface-type light emitting device, by controlling doping of the Si thin layer, and there may be further provided a second electrode wiring of two wires formed on the first substrate and the elastic supporter and electrically connected to the p-side and n-side electrodes of the photodetector, respectively, to drive the photodetector. In a case where the elastic supporter of the Si thin layer, such as a cantilever, is used, the photodetector can be built in the Si thin layer and the surface-type light emitting device can be formed on the photodetector with a junction therebetween. Thus, a compact SNOM head or the like with the integrated surface-type light emitting device and photodetector can be realized.

The photodetector may be a Schottky-barrier-type photodetector with a contact between metal and semiconductor integrally formed at a position on the elastic supporter of an Si thin layer, at which the photodetector can detect output light of the surface-type light emitting device, and there may be further provided a second electrode wiring of two wires formed on the first substrate and the elastic supporter and electrically connected to the p-side and <n-side electrodes of the photodetector, respectively, to drive the photodetector.

The photodetector may be integrally laid down on the surface-type light emitting device with a junction therebetween, the photodetector and the surface-type light emitting device may be placed on the elastic supporter, and there may be further provided a second electrode wiring of two wires formed on the first substrate and the elastic supporter and electrically connected to the p-side and n-side electrodes of the photodetector, respectively, to drive the photodetector.

The photodetector may be formed-on a third substrate, and the third substrate is aligned with and bonded to the first substrate in such a manner that the photodetector can monitor output light of the surface-type light emitting device emitted to a side of the third substrate.

The first electrode wiring may include two wires connected to the p-side and n-side electrodes of the surface-type light emitting device, respectively. One of the two electrodes of the surface-type light emitting device and one of the two electrodes of the photodetector may be electrically connected to each other to be a common electrode. One of the two wires of the first electrode wiring and one of the two wires of the second electrode wiring may be connected to the common electrode to be a common wire. The other of the two wires of the first electrode wiring and the other of the two wires of the second electrode wiring are separately formed.

A plurality of the photodetectors may be arranged. In this case, plural sets of surface-type optical devices and photodetectors may be arranged on plural elastic supporters supported by a common first substrate, respectively, or plural photodetectors may be arranged on the third substrate. In this construction, each set of the surface-type optical device and the photodetector may be mounted on each elastic supporter, as illustrated in FIG. 17, or each surface-type optical device may be mounted on each elastic supporter while plural photodetectors are arranged on the third substrate corresponding to the respective optical devices.

A plurality of the photodetectors or a plurality of the surface-type optical devices may be arranged on the elastic supporter. In this case, plural set of the surface-type optical devices and the photodetectors may be mounted on the elastic supporter, as illustrated in FIG. 16, or plural surface-type optical devices may be mounted on the elastic supporter while plural photodetectors are arranged on the third substrate corresponding to the respective optical devices.

The elastic supporter may be formed of a plurality of thin layers which are the same as at least a portion of a functional portion of the surface-type optical device consisting of a plurality of thin layers formed on the first substrate. In this structure, the elastic supporter and the surface-type optical device are continuously formed, and a portion of the first substrate under the elastic supporter and the surface-type optical device is removed. According to such a structure, a compact light source apparatus suitable for use in a near-field optical system and a compact apparatus with SNOM heads arrayed on a common substrate-can be readily achieved.

The minute opening of the surface-type optical device may be formed in a minute protruding member, which is formed of an uppermost layer of the functional portion of the surface-type optical device and covered with a light-blocking layer with only a tip of the protruding member uncovered.

In the structure with the elastic supporter formed of the plural thin layers, the functional portion of the surface-type optical device may be a plurality of semiconductor thin layers epitaxially formed on the first substrate. In this structure, the optical device can be formed on the elastic supporter, including the semiconductor thin layers. According to such a structure with the optical device formed from the semiconductor functional layers, the elastic supporter and the optical device can be integrally fabricated on a common substrate without a complicated process, and an SNOM head or the like, with a high radiation efficiency and a high processing precision, can be readily achieved. The thin-layer structure of the semiconductor thin layers can be further thinned by etching the semiconductor thin layers from their uppermost surface.

The elastic supporter of the thin layers may include a layer, which is the same as a cladding layer, a semiconductor multi-layer mirror, or a dielectric multi-layer mirror of the surface-type optical device.

The plural semiconductor thin layers may include at least one of a layer of GaAs, a layer of AlGaAs and a layer of InGaAs, and the first substrate may be a substrate of GaAs. When a structure of AlGaAs/GaAs or InGaAs/AlGaAs/GaAs series is formed on the GaAs substrate, a highly-effective surface-type optical device can be provided.

The plural semiconductor thin layers may include at least one of a layer of GaN, a layer of AlGaN and a layer of InGaN. When material of the GaN series is used, a light source apparatus suitable for use in an optical recording or exposure apparatus can be provided.

The first electrode wiring may include a wire formed of an electrically-conductive layer of the elastic supporter. In this structure, the electric wiring can be readily constructed.

A plurality of the surface-type optical devices may be placed on a plurality of the elastic supporters formed from the thin layers and commonly supported by the first substrate, with each said surface-type optical device placed on a different said elastic supporter. In this construction, each set of the surface-type optical device and a photodetector may be mounted on each elastic supporter as illustrated in FIG. 26, or each surface-type optical device is mounted on each elastic supporter, while plural photodetectors are arranged on a third substrate, as illustrated in FIG. 23, corresponding to the respective optical devices.

A plurality of the surface-type optical devices may be arranged on the elastic supporter formed of the plural thin layers. In this case, plural set of the surface-type optical devices and photodetectors may be mounted on the elastic supporter-as illustrated in FIG. 25, or plural surface-type optical devices may be mounted on the elastic supporter while plural photodetectors are arranged on a third substrate corresponding to the respective optical devices.

In the structure with the elastic supporter formed of the plural thin layers, a photodetector may be formed on a third substrate, and the third substrate may be aligned with, and bonded to the first substrate in such a manner, that the photodetector can monitor output light of the surface-type light emitting device emitted to a side of the third substrate.

In the above structures, the elastic supporter may have a bimorphic structure in which a pair of electrodes sandwiching a layer of piezoelectric material are formed on each of upper and lower surfaces thereof, such that the elastic supporter can be adjustably moved when an electric field is applied across the layer of piezoelectric material, or such that a motion of the elastic supporter can be detected through electric carriers induced in the layer of piezoelectric material. Further, a piezoelectric resistor may be formed in the elastic supporter to detect a motion of the elastic supporter through a change in its resistance.

The present invention is also-directed to surface-type optical apparatus including an elastic supporter and a surface-type optical device, which is placed on a tip of the elastic supporter and includes a member with a minute opening for passing light therethrough. In this structure, the elastic supporter may be shaped into a cantilever, or the elastic supporter may include a layer constituting the surface-type optical device.

The present invention is further directed to the following fabrication methods.

A method of fabricating a surface-type optical apparatus, having a surface-type optical device with p-side and n-side electrodes, a first substrate for supporting the surface-type optical device through an elastic supporter, and an electrode wiring comprising of at least a wire formed on the elastic supporter and electrically connected to either of the electrodes and in which a current is injected into or a voltage is applied across the surface-type optical device through the electrode wiring and the p-side and n-side electrodes, the surface-type optical device includes functional layers grown on a second substrate of semiconductor, and the second substrate is mounted on the elastic supporter, includes a step of forming a layer of the elastic supporter on the first substrate, a step of forming the functional layers of the surface-type optical device on the second substrate, a step of forming a current injection region and the electrodes of the surface-type optical device in the functional layers, a step of forming the electrode wiring on the layer of the elastic supporter, a step of bonding the electrode of the surface-type optical device to the electrode wiring on the elastic supporter, and a step of etching a portion of the first substrate under the surface-type optical device and the electrode wiring.

A method of fabricating a surface-type optical apparatus, having a surface-type optical device with p-side and n-side electrodes, a first substrate for supporting the surface-type optical device through an elastic supporter, and an electrode wiring comprising of at least a wire formed on the elastic supporter and electrically connected to either of the electrodes, and in which a current is injected into or a voltage is applied across the surface-type optical device through the electrode wiring and the p-side and n-side electrodes, and the surface-type optical device includes functional layers grown on a second substrate of semiconductor, includes a step of forming a layer of the elastic supporter on the first substrate, a step of forming the functional layers of the surface-type optical device on the second substrate, a step of forming the electrode wiring on the layer of the elastic supporter, a step of bonding an upper surface of the functional layers of the surface-type optical device to the electrode wiring on the elastic supporter by using a direct solid-phase junction, a step of removing the second substrate with the functional layers being left on the elastic supporter, and a step of etching a portion of the first substrate under the surface-type optical device and the electrode wiring.

A method of fabricating a surface-type optical apparatus, having a surface-type light emitting device with p-side and n-side electrodes, a first substrate for supporting the surface type light emitting device through an elastic supporter, an electrode wiring comprising of at least a wire formed on the elastic supporter and electrically connected to either of the electrodes, and a photodetector formed on a third substrate, and in which a current is injected into or a voltage is applied across the surface-type light emitting device through the electrode wiring and the p-side and n-side electrodes, the surface-type light emitting device includes functional layers grown on a second substrate of semiconductor, and the second substrate is mounted on the elastic supporter, includes a step of forming a layer of the elastic supporter on the first substrate, a step of forming the functional layers of the surface-type light emitting device on the second substrate, a step of forming a current injection region and the electrodes of the surface-type light emitting device in the functional layers, a step of forming the electrode wiring on the layer of the elastic supporter, a step of bonding the electrode of the surface-type light emitting device to the electrode wiring on the elastic supporter, a step of etching a portion of the first substrate under the surface-type optical device and the electrode wiring, and a step of aligning the third substrate with and bonding the third substrate to the first substrate in such a manner that the photodetector can monitor output light of the surface-type light emitting device emitted to a side of the third substrate.

A method of fabricating a surface-type optical apparatus, having a surface-type optical device with p-side and n-side electrodes, a first substrate for supporting the surface-type optical device through an elastic supporter, and an electrode wiring comprising of at least a wire formed on the elastic supporter and electrically connected to either of the electrodes, and in which a current is injected into or a voltage is applied across the surface-type optical device through the electrode wiring and the p-side and n-side electrodes, and the surface-type optical device includes functional layers, includes a step of forming the functional layers of the surface-type optical device on the first substrate, a step of forming a current injection region and the electrodes of the surface-type optical device in the functional layers, a step of etching the functional layers into a shape of the elastic supporter, and a step of etching a portion of the first substrate from a side opposite to a side of the functional layers.

A method of fabricating a surface-type optical apparatus, having a surface-type light emitting device with p-side and n-side electrodes, a first substrate for supporting the surface-type light emitting device through an elastic supporter, an electrode wiring comprising of at least a wire formed on the elastic supporter and electrically connected to either of the electrodes, and a photodetector formed on a second substrate, and in Which a current is injected into or a voltage is applied across the surface-type light emitting device through the electrode wiring and the p-side and n-side electrodes, and the surface-type light emitting device includes functional layers, includes a step of forming the functional layers of the surface-type light emitting device on the first substrate, a step of forming a current injection region and the electrodes of the surface-type light emitting device in the functional layers, a step of etching the functional layers into a shape of the elastic supporter, a step of etching a portion of the first substrate from a side opposite to a side of the functional layers, a step of forming the photodetector on the second substrate, and a step of aligning the second substrate with and bonding the second substrate to the first substrate in such a manner that the photodetector can monitor C output light of the surface-type light emitting device emitted to a side of the second substrate Furthermore, the present invention is directed to the following use methods.

A method of using a surface-type optical apparatus as a detector of information on a medium surface, the surface-type optical apparatus having a surface-type optical device with p-side side and n-side electrodes, a substrate for supporting the surface-type optical device, and an electrode wiring comprising of at least a wire formed on the substrate and electrically connected to either of the electrodes, and in which a current is injected into or a voltage is applied across the surface-type optical device through the electrode wiring and the p-side and n-side electrodes, includes a step of injecting a current into the surface-type optical device to emit light to the medium surface from the surface-type optical device, and a step of detecting an intensity of scattering light returned to the surface-type optical device from the medium surface through a variation in the current or the voltage across the electrodes of the surface-type optical device.

A method of using a surface-type light emitting apparatus as a detector of information on a medium surface, the surface-type light emitting apparatus having a surface-type light emitting device with p-side and n-side electrodes, a substrate for supporting the surface-type light emitting device, an electrode wiring comprising of at least a wire formed on the substrate and electrically connected to either of the electrodes, and a photodetector placed on a side of the surface-type light emitting device opposite to the medium surface, and in which a current is injected into or a voltage is applied across the surface-type light emitting device through the electrode wiring and the p-side and n-side electrodes, includes a step of injecting a current into the surface-type light emitting device to emit light to the medium surface from the surface-type light emitting device, and a step of detecting a variation in light emitted toward the photodetector from the surface-type light emitting device by the photodetector. In this method, the variation is caused by a change in an intensity of scattering light returned to the surface-type light emitting device from the medium surface.

A method of using a surface-type optical apparatus as an optical information recording apparatus, the surface-type optical apparatus having a surface-type optical device with p-side and n-side electrodes and a member with a minute opening for generating evanescent light, a substrate for supporting the surface-type optical device, and an electrode wiring comprising of at least a wire formed on the substrate and electrically connected to either of the electrodes, and in which a current is injected into or a voltage is applied across the surface-type optical device through the electrode wiring and the p-side and n-side electrodes, includes a step of injecting the current into the surface-type optical device modulated in accordance with a signal information, and a step of applying evanescent light to a surface of an optical recording medium from the surface-type optical device to record the information on the medium surface.

A method of using a surface-type optical apparatus as an optical exposure apparatus, the surface-type optical apparatus having a surface-type optical device with p-side and n-side electrodes and a member with a minute opening for generating evanescent light, a substrate for supporting the surface-type optical device, and an electrode wiring comprising of at least a wire formed on the substrate and electrically connected to either of the electrodes, and in which a current is injected into or a voltage is applied across the surface-type optical device through the electrode wiring and the p-side and n-side electrodes, includes a step of injecting the current into the surface-type optical device on the basis of a signal, and a step of applying evanescent light to a photosensitive medium from the surface-type optical device to form an optically-exposed pattern on the medium.

A method of using a surface-type optical apparatus, having a surface-type optical device with p-side and n-side electrodes and a minute protrusion member electrically connected to either of the electrodes, a substrate for supporting the surface-type optical device, and an electrode wiring of at least a wire formed on the substrate and electrically connected to either of the electrodes, and in which a current, or tunnel current, is injected into or a voltage is applied across the surface-type optical device through the electrode wiring and the p-side and n-side electrodes, includes a step of bringing a tip of the minute protrusion member in contact with or close to a surface of a medium, and a step of causing the current or the tunnel current to flow into the medium to perform an observation of the medium, a tracking on the medium, or an information recording in the medium.

A method of using a surface-type optical apparatus as a scanning tunnel microscope, the surface-type optical apparatus having a surface-type optical device with p-side and n-side electrodes and a minute protrusion member electrically connected to either of the electrodes, a substrate for supporting the surface-type optical device, and an electrode wiring of at least a wire formed on the substrate and electrically connected to either of the electrodes, and in which a current or a tunnel current is injected into or a voltage is applied across the surface-type optical device through the electrode wiring and the p-side and n-side electrodes, includes a step of bringing a tip of the minute protrusion member in contact with or close to a surface of a conductive medium, and a step of causing the current or the tunnel current to flow into the surface-type optical device through the medium and the minute protrusion member, and a step of detecting a change in the current or a voltage across the electrodes caused by a condition of the surface of the conductive medium.

A method of using a surface-type optical apparatus as a scanning tunnel microscope, the surface-type optical apparatus, having a surface-type light emitting device with p-side and n-side electrodes and a minute protrusion member electrically connected to the electrode, a substrate for supporting the surface-type light emitting device, an electrode wiring comprising of at least a wire formed on the substrate and electrically connected to either of the electrodes, and a photodetector for receiving light from the surface-type light emitting device, and in which a current or a tunnel current is injected into or a voltage is applied across the surface-type light emitting device through the electrode wiring and the p-side and n-side electrodes, includes a step of bringing a tip of the minute protrusion member in contact with or close to a surface of a conductive medium, a step of causing the current or the tunnel current to flow into the surface-type light emitting device through the medium and the minute protrusion member, and a step of detecting a change in output light of the surface-type light emitting device by the photodetector. In this method, the change in the output light is caused by a change in the current due to a condition of the surface of the conductive medium.

A method of using a surface-type optical apparatus as an atomic force microscope, the surface-type optical apparatus, which includes a surface-type optical device with p-side and n-side electrodes and a minute protrusion member, a substrate for supporting the surface-type optical device through an elastic supporter, and an electrode wiring comprising of at least a wire formed on the substrate and electrically connected to either of the electrodes, and in which a current is injected into or a voltage is applied across the surface-type optical device through the electrode wiring and the p-side and n-side electrodes, includes a step of bringing a tip of the minute protrusion member in contact with or close to a surface of a medium, and a step of detecting a motion of the elastic supporter due to an interatomic force between the tip of the minute protrusion member and the medium surface.

A method of using a surface-type optical apparatus as an atomic force microscope, the surface-type optical apparatus, which includes a surface-type light emitting device with p-side and n-side electrodes and a minute protrusion member, a substrate for supporting the surface-type light emitting device through an elastic supporter, and an electrode wiring of at least a wire formed on the substrate and electrically connected to either of the electrodes, and a photodetector for receiving light from the surface-type light emitting device, and in which a current is injected into or a voltage is applied across the surface-type light emitting device through the electrode wiring and the p-side and n-side electrodes, includes a step of injecting the current into the surface-type light emitting device to emit light therefrom, a step of bringing a tip of the minute protrusion member in contact with or close to a surface of a medium, a step of causing a motion of the elastic supporter due to an interatomic force, and a step of detecting a change in a position of the light received by the photodetector. In this method, the change in the position is caused by the motion of the elastic supporter due to the interatomic force between the tip of the minute protrusion member and the medium surface.

A method of using a surface-type optical apparatus as an optical pincette, the surface-type optical apparatus, having a surface-type optical device with p-side and n-side electrodes and a member with a minute opening for generating evanescent light, a substrate for supporting the surface-type optical device, and an electrode wiring of at least a wire formed on the substrate and electrically connected to the electrode, and in which a current is injected into or a voltage is applied across the surface-type optical device through the electrode wiring and the p-side and n-side electrodes, includes a step of injecting a current into the surface-type optical device to generate the evanescent light, a step of trapping a small particle by the evanescent light, a step of moving the trapped small particle to a desired position, and a step of stopping the current to terminate the evanescent light and place the particle at the desired position.

These and other advantages will be more readily understood in connection with the following detailed description of the more preferred embodiments in conjunction with the drawings.

DESCRIPTION OF THE PREFERRED EMBODIMENTS (First Embodiment)

Figure 1:
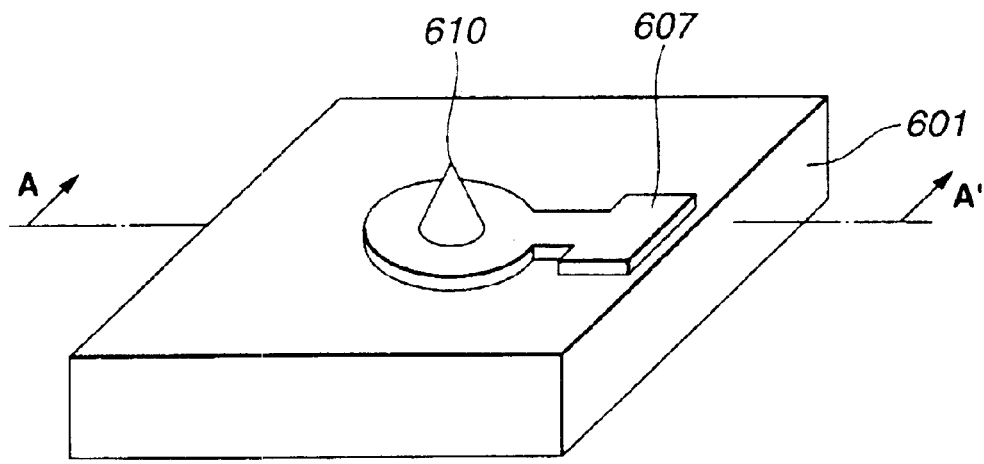
FIG. 1 is a perspective view illustrating a conventional light source apparatus for a near-field optical system.
Figure 2:
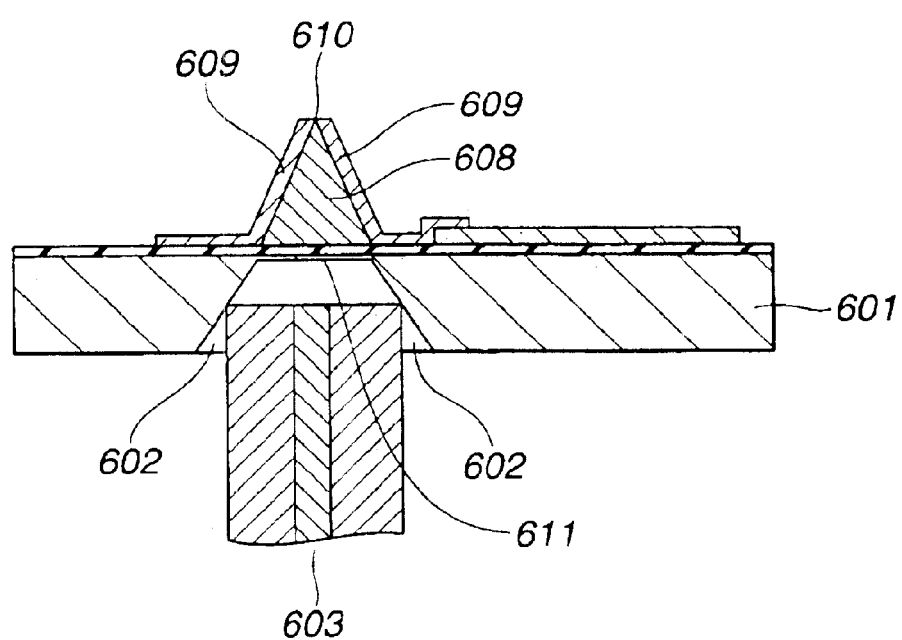
FIG. 2 is a cross-sectional view taken along a line A–A' of FIG. 1.
Figure 3:
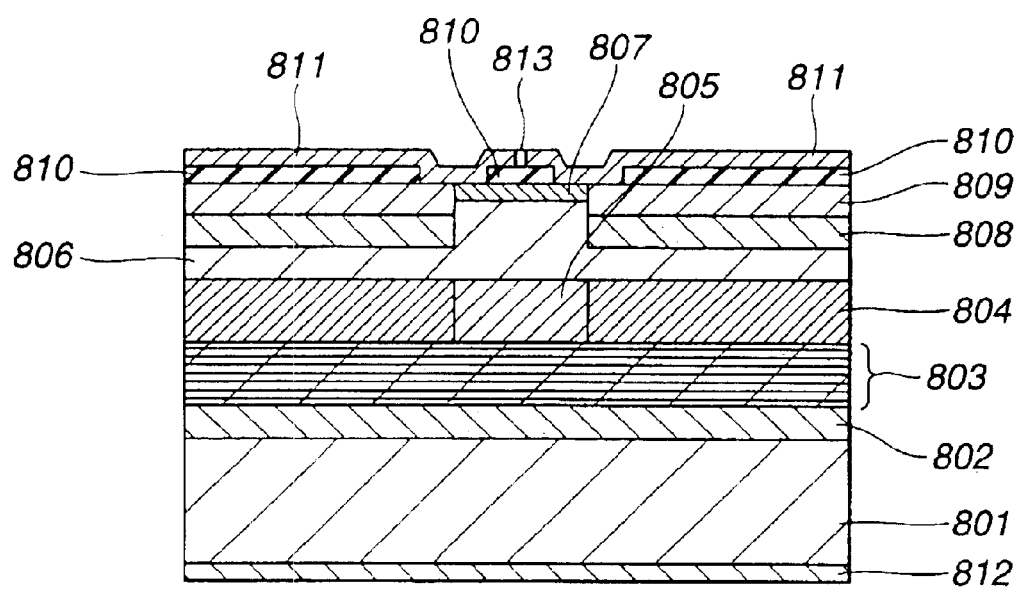
FIG. 3 is a cross-sectional view illustrating another conventional light source apparatus for a near-field optical system.
Figure 4:
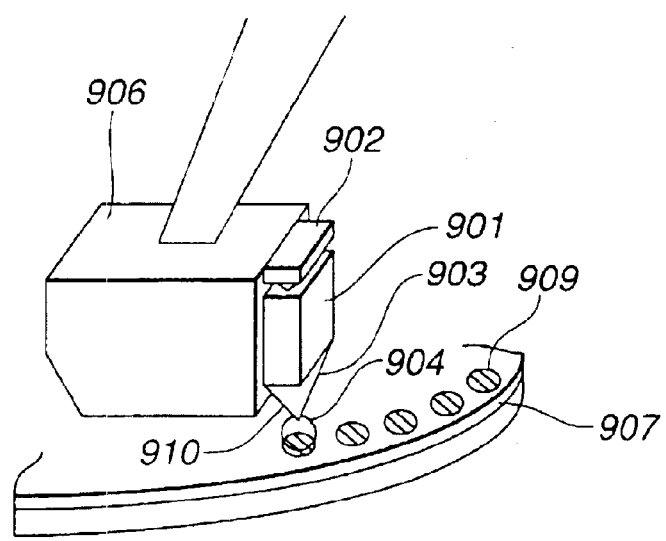
FIG. 4 is a perspective view illustrating yet another conventional light source apparatus for a near-field optical system.
Figure 5A:
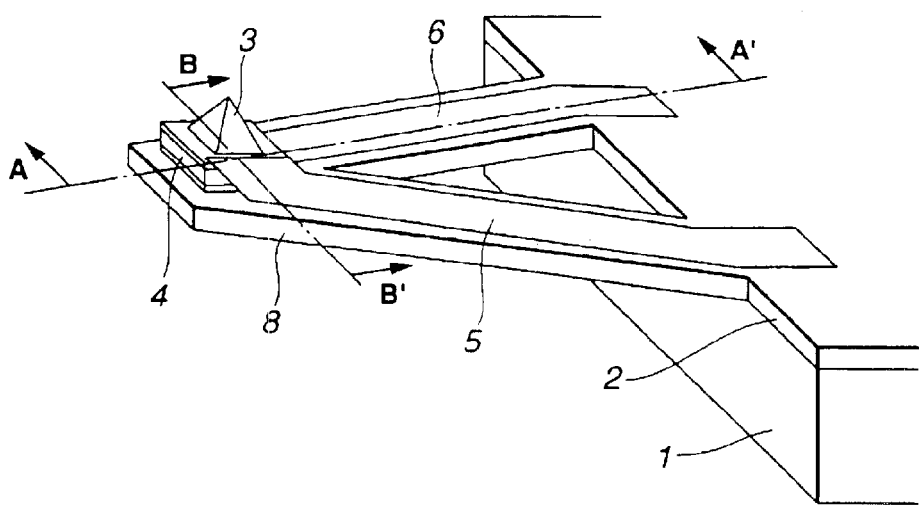
FIG. 5A is a perspective view illustrating a first embodiment of a surface-type optical apparatus according to the present invention, which is directed to a light source apparatus for a near-field optical system.
Figure 5B:
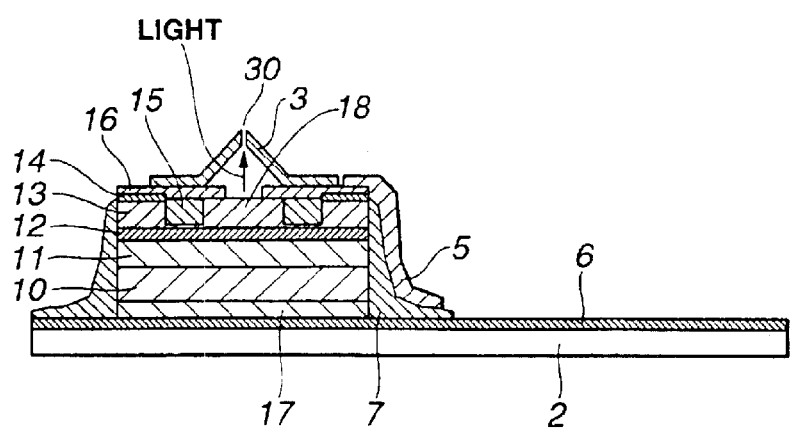
FIG. 5B is a cross-sectional view illustrating the first embodiment, taken along a line A–A' of FIG. 5A.

FIGS. 5A and 5B illustrate a first embodiment of a SNOM head of the present invention. The SNOM head includes a surface emitting laser, a protrusion member with a minute opening, which is formed on the surface of epitaxial layers of the laser, and a cantilever to a tip of which the laser with the protrusion member is mounted.

As illustrated in FIG. 5A of a perspective view and FIG. 5B of an A–A' cross-sectional view of FIG. 5A, a surface emitting laser 4 used in this embodiment includes a one-wavelength cavity 12 consisting of an AlGaAs/GaAs multiple quantum well (MQW) active layer, an AlGaAs spacer layer, and n-type and p-type distributed Bragg reflector (DBR) mirrors 11 and 13 consisting of multiple (about twenty (20) to thirty (30) pairs) AlAs/AlGaAs layers of a ¼-wavelength thickness that sandwich the cavity 12. These layers are epitaxially grown on an n-GaAs substrate 10 by a metal organic vapor phase epitaxy (MOVPE), for example. An uppermost layer of the DBR mirror 13 is highly doped to achieve an easy electrode contact. To form a current constricting structure (which has a diameter of 15 microns in this embodiment) in a light radiation region 18 of the laser 4, annual etching is conducted down to the neighborhood of the active layer and the formed etched annular recess is buried with a polyimide 15 to flatten the surface.

An insulating layer 14 of SiN or the like is deposited as illustrated in FIG. 5B, and a p-side electrode 16 with a window for light emission is laid down on and around the insulating layer 14. The p-side electrode 16 consists of Cr/Au, for example. After the GaAs substrate 10 is thinned to less than 80 microns by polishing, an n-side electrode 17 is formed on the bottom surface of the GaAs substrate 10. The n-side electrode 17 consists of AuGe/Au, for example.

A tetrahedrally shaped protrusion member 3 with a minute opening 30 on its tip is mounted on the p-side electrode 16 of the surface emitting laser 4 by pressure bonding the metals. The protrusion member 3 is formed of an Au foil, for example. The minute opening 30 is formed such that evanescent light leaks through it. The minute protrusion member 3 is used in this embodiment, but in place thereof the entire light emission surface of the laser may be covered with an electrode and a minute opening may be formed at its center.

The light radiating laser 4 is mounted on a tip portion of an elastic cantilever 8 formed of an $SiN_1$ layer 2 laid down over an Si substrate 1. Here, the cantilever 8 has a shape of a trapezoid with its central portion being removed. Thus, the SNOM head is supported by the elastic cantilever 8 formed of the $SiN_x$ layer 2.

A current injection into the laser 4 is performed through a set of electrode wiring, or patterns, 5 and 6 formed on two arms of the cantilever 8. The electrode pattern 6 formed on one of the two arms of the cantilever 8 is electrically connected to the n-side electrode 17 of the surface emitting laser 4. The electrode pattern 5 wired on the other arm of the cantilever 8 is electrically connected to the p-side electrode 16 of the laser 4 through a conductive portion formed on a polyimide 7, which is deposited to smooth a step formed by the end face of the laser 4.

In this embodiment, the size of the surface emitting laser chip is 50 microns×50 microns, a side length of the bottom of the protrusion member 3 with the opening 30 is 20 microns, and a diameter of the minute opening 30 is several tens of nanometer. As described above, the cantilever 8 is of a trapezoidal shape with a tip lateral length of 100 microns, a root lateral length of 300 microns and a total longitudinal length of 300 microns. Its central portion of a triangular shape is cut out as illustrated in FIG. 5A.

The fabrication process of the SNOM head of this embodiment will be described in reference to FIGS. 6A through 6E.

Figure 6A:
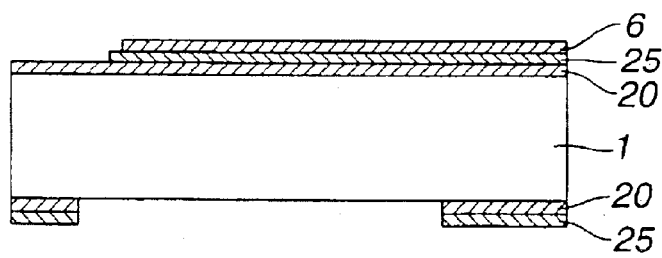
FIGS. 6A–6E are cross-sectional views illustrating fabrication steps of a fabrication method for the first embodiment, respectively.

As illustrated in FIG. 6A, a $SiO_2$ layer 20 with a thickness of 0.3 microns is formed by thermal oxidization and a silicon nitride layer 25 with a thickness of 2 microns is then formed by a chemical vapor deposition (CVD) method, on both opposite surfaces of the Si (100) substrate 1 with a thickness of 500 microns. The electrode pattern 6 is then formed on the upper $SiN_x$ layer 25 using a lift-off method. After that, the electrode pattern 6 is shaped into one arm of the cantilever shape as illustrated in FIG. 5A by using photolithography and reactive ion etching (RIE) of $CF_4$ plasma. Then, the $SiN_x$ layer 25 and the $SiO_2$ layer 20 on the lower surface side are shaped into a mask pattern for a back-etching of the substrate 1.

Figure 6B:
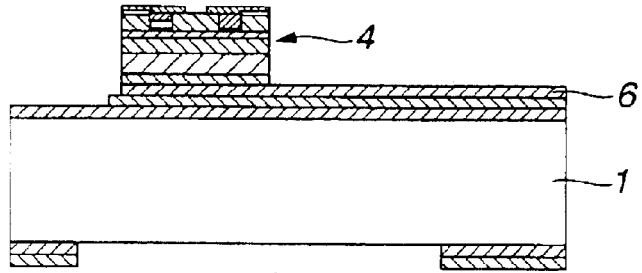

As illustrated in FIG. 6B, the surface emitting laser 4 is out into a square of about 250 microns×250 microns and is bonded on a tip portion of the electrode pattern 6 by using a solderless pressure bonding, a solder, an electrically-conductive adhesive, or the like. After that, the laser 4 is cut down into the shape of 50 microns×50 microns by photolithography add wet etching of sulfuric acid series. For example, when an array of the surface emitting lasers 4 is formed on the GaAs substrate 10 at intervals corresponding to bonding places on the cantilevers 8, the following steps are conducted: 1) the Si substrate 1 for the cantilevers 8 and the laser substrate 10 with large sizes (for example, 2 cm×2 cm) are prepared, and then aligned and bonded entirely; 2) lasers 4 of 50 microns×50 microns are etched out, respectively.

Figure 6C:
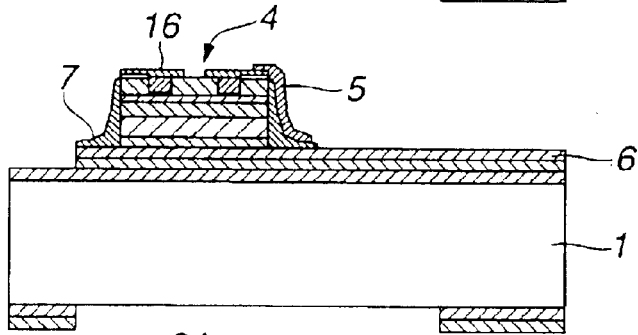

As illustrated in FIG. 6C, the polyimide 7 is entirely deposited, and the RIE etching is entirely performed using oxygen plasma to smooth a stepped portion of the surface emitting laser 4. Due to this smoothing, the upper p-side electrode 16 of the laser 4 can be smoothly connected to the electrode pattern 5 on the other arm of the cantilever 8.

Figure 6D:
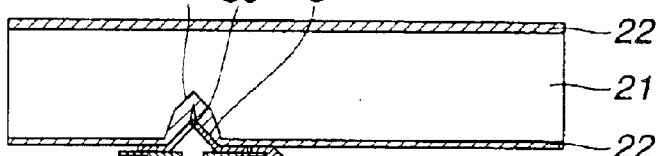

As illustrated in FIG. 6D, the minute protrusion member 3 with the minute opening 30 is formed on another substrate 21. The protrusion member 3 is aligned with the opposed surface emitting laser 4 and bonded on its light emission surface by applying a pressure to each other. Upon removing the substrate 21 form the side of the Si substrate 1, the protrusion member 3 is separated from the interface of a stripping compound layer 22 on the substrate 21. Only the protrusion member 3 is thus left on the laser 4.

The minute protrusion member 3 can be fabricated as follows. The substrate 21 of an Si (100) substrate is prepared, and a thermally-oxidized mask layer with a window having a square shape of. 20 microns×20 microns is formed thereon by photolithography and etching, using a liquid mixture of hydrofluoric acid and ammonium fluoride. Then, a pyramid-shaped recess 24 with a depth of about 14 microns defined by four surfaces, each equivalent to a (111) surface, is formed by a crystallographic-axis anisotropic etching using a 30% potassium hydroxide solution heated to 90° C. After the thermally-oxidized mask layer is removed, the substrate 21 is again thermally oxidized at 1000° C. and a silicon dioxide of the stripping compound layer 22 with a thickness of 400 nm is formed. Then, Au of a light-blocking layer is vacuum-evaporated to form the pyramid-shaped protrusion member 3, which is formed of an Au foil. At this time, a portion without Au deposition is formed at a tip of the recess 24 by inclining a vacuum evaporation source relative to the substrate 21. The minute opening 30 is thus obtained. The light-blocking layer of Au is used in this embodiment, but metals, such as Pt, W, Ti or Cr, semiconductors, or dielectric materials can also be used.

Figure 6E:
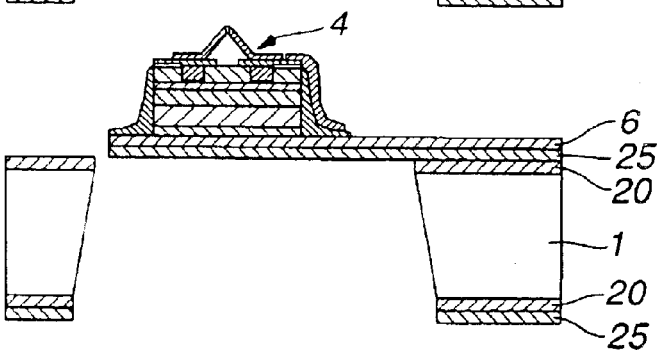

Turning again to the fabrication method of the SNOM head, as illustrated in FIG. 6E, polyimide is spin-coated on the substrate surface to form a protective layer. Then, the substrate 1 is etched from its bottom surface with the $SiN_x$ layer 25 on the substrate bottom acting as an etching mask, using a 30% potassium hydroxide solution heated to 90° C. Thereafter, the silicon dioxide 20 is removed by wet etching of hydrofluoric acid series. Finally, the above surface protective layer is etched by oxygen plasma RIE, and the cantilever-type SNOM head is hence obtained.

In the first embodiment, a highly-effective small SNOM head, which can accurately and flexibly follow the medium surface, can be readily fabricated. Using this head, image observation with a super-high resolving power (in this case, a photodetector with a minute opening may be present), optical recording, optical exposure and the like can be performed.

In this embodiment described above, the surface emitting laser of AlGaAs/GaAs series in a band of 780–850 nm is used, but lasers in other wavelength bands such as a laser of InGaN/GaN series in a band of about 400 nm, a laser of InGaAs/GaAs series in a band of 980 nm and lasers of InGaAsP/InP series and InGaNAs/GaAs series in a band of 1.3–1.55 microns, can also be used.

Further, a surface-type light emitting diode (which, for example, has the laser structure described above without multi-layer mirrors), an electroluminescence (LE) device (which may contain a material other than a semiconductor) and the like can also be used for some applications requiring a reduction in cost, despite a probable lowering efficiency.

The trapezoidal cantilever structure is used as a resilient or elastic support in this embodiment. However, other elastic supporters, such as a rectangular cantilever, an ambisupporting lever, a cross-shaped lever (in this case, the surface-type optical device is placed on its crossed portion) and a hinged supporter (in this case, its root portion can pivot about an axis), can also be used.

(Second Embodiment)

A second embodiment of this invention is directed to a structure in which a surface emitting laser placed on the tip of a cantilever is further thinned to reduce its weight so that the size of the cantilever can be decreased and intervals between cantilevers reduced in a multi-lever structure.

Figure 7:
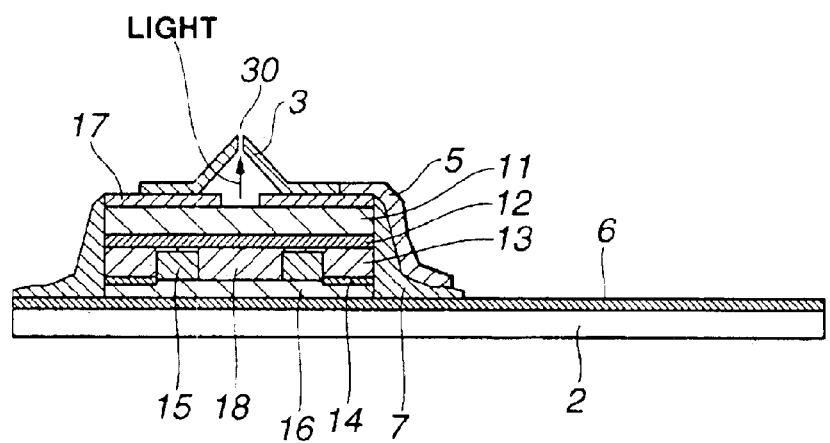
FIG. 7 is a cross-sectional view illustrating a second embodiment of a surface-type optical apparatus according to the present invention, which is directed to a light source apparatus for a near-field optical system.

FIG. 7 illustrates a cross section of the tip portion of the cantilever in the second embodiment. In FIG. 7, the reference numerals correspond to those in FIGS. 5A and 5B and denote portions having the same functions as those in FIGS. 5A and 5B. In the first embodiment, the GaAs substrate 10 with the functional portion of the laser thereon is bonded to the cantilever 8. In the second embodiment, however, an epitaxial layer side of the laser 4 is bonded to the cantilever 8, and the GaAs substrate 10 is fully removed by selective etching to leave only the epitaxial layers. The electrode 17 with the light-taking window and the protrusion member 3 with the minute opening 30 are then formed on a newly-exposed epitaxial surface, which has been in contact with the GaAs substrate 10 until it was removed.

Here, an uppermost layer of the DBR mirror 11 on the side of the GaAs substrate 10, i.e., the first growth layer of the mirror 11 on the GaAs substrate 10, is composed of $Al_yGa_{(1-y)}As$ (y=0.3) having a doping concentration of $n=5\times10^{18}$ cm$^{-3}$. That uppermost layer acts as a stopping layer at the time of etching the GaAs substrate 10 as well as a contact layer for the n-side electrode 17. Other structures of the second embodiment are substantially the same as those of the first embodiment.

Figure 8A:
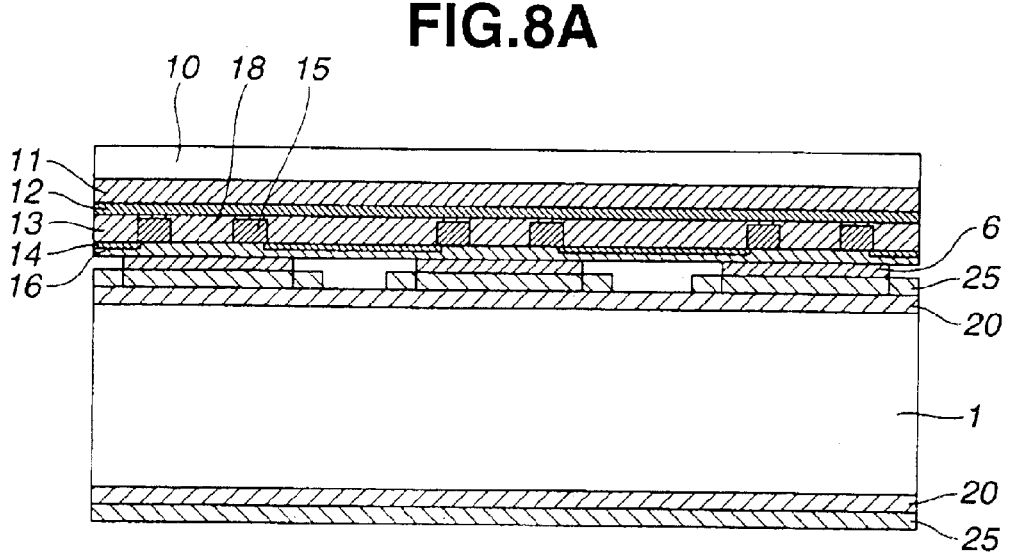
FIGS. 8A–8C are cross-sectional views illustrating fabrication steps of a fabrication method for a structure in which a plurality of light source apparatuses of the second embodiment are arrayed.
Figure 8B:
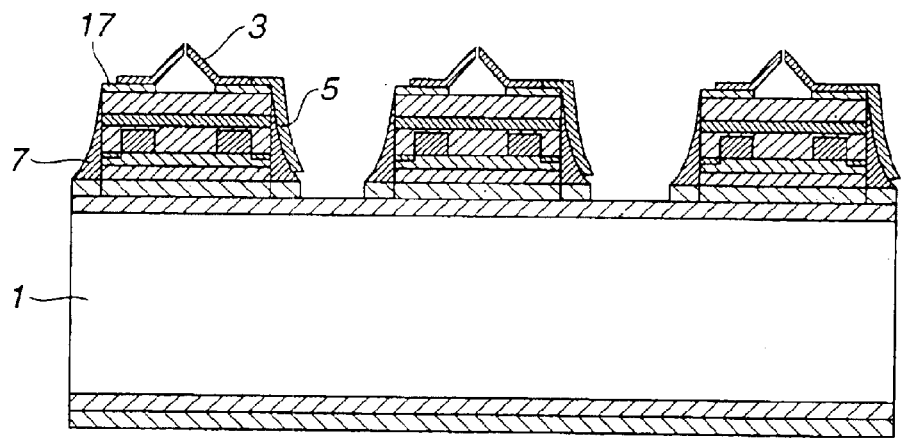
Figure 8C:
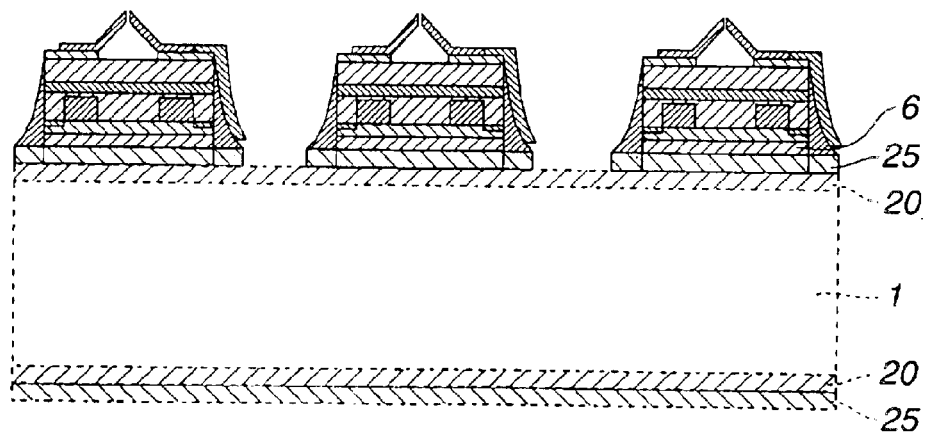

FIGS. 8A to 8C illustrate the fabrication process of the second embodiment. These figures are cross-sectional views taken along a direction perpendicular to the cross-sectional direction of FIGS. 6A to 6E, such that an array of SNOM heads can be readily seen. In other words, FIGS. 8A to 8C illustrate cross sections viewed from the tip of the SNOM head (i.e., taken along the line B–B' of FIG. 5A).

As illustrated in FIG. 8A, similarly to the first embodiment, after the $SiO_2$ layer 20 and the SiN layer 25 are formed on the substrate 1 and the electrode wiring pattern 6 of Cr/Au, or the like, is laid down thereon., the $SiN_x$ layer 25 is shaped into the pattern of the cantilever 8. The second embodiment differs from the first embodiment in that the thickness of the SiN layer 25 of the cantilever is reduced to 0.5 microns since the weight of the laser portion is decreased in the second embodiment.

However, a two-dimensional array of surface emitting lasers are formed on the GaAs substrate 10 at the same intervals as those of the tip portions of the cantilevers, with structures similar to the laser structure of the first embodiment. Those arrayed lasers are aligned with and bonded on the electrode patterns 6 at their surfaces on the side of the DBR mirror 13, as illustrated in FIGS. 8A to 8C. This is performed by an electrically-conductive connection between the laser electrode 16 and the electrode wiring 6 on the cantilever. At this stage, the GaAs substrate 10 is polished to a thickness of about 100 microns. The second embodiment differs from the first embodiment in that no window is formed in the p-side electrode 16, since light from a radiation region 18 is not emitted through the epitaxial layer side.

Here, the SiN$_x$ layer 25 and the SiO$_2$ layer 20 on the bottom surface of the Si substrate 1 are shaped into a mask pattern for the back-etching of the substrate 1.

As illustrated in FIG. 8B, when the GaAs substrate 10 is etched at 40° C. using a liquid mixture of ammonia and hydrogen peroxide solution, only the GaAs substrate 10 can be removed because a selective ratio of the etching rate of the GaAs substrate 10 relative to the etching rate of the above AlGaAs layer (a layer (not shown) between the GaAs substrate 10 and the DBR mirror 11) is large. Then, after the n-side electrode 17 with a light-taking window is formed, photolithography and etching are performed to leave only surface emitting laser regions of about 40 microns×40 microns at tip portions of the cantilevers, respectively. The etching is conducted at room temperature, using a liquid mixture of sulfuric acid, hydrogen peroxide solution and water. Further, similar to the first embodiment, the wiring of electric wires to the n-side electrodes 17 of Ti/Pt/Au is built, and the protrusion member 3 with the minute opening 30 is bonded on each n-side electrode 17 while applying a pressure thereto.

As illustrated in FIG. 8C, similar to the first embodiment, etching of the Si substrate 1 and so forth are performed to complete the SNOM head array. Etched portions (1, 20 and 25) are illustrated with dot-and-dash lines in FIG. 8C.

In the second embodiment, the size of the surface emitting laser 4 is made as small as possible, i.e., a square of 40 microns×40 microns and a thickness of about 4 microns. Therefore, the weight of the SNOM head is drastically decreased and the size of the cantilever is reduced. Thus, intervals of the arrayed lasers 4 can be decreased. Also, the resonance frequency of each SNOM head is increased, so that the head can flexibly and accurately follow and trace the surface of a medium when used.

Figure 9:
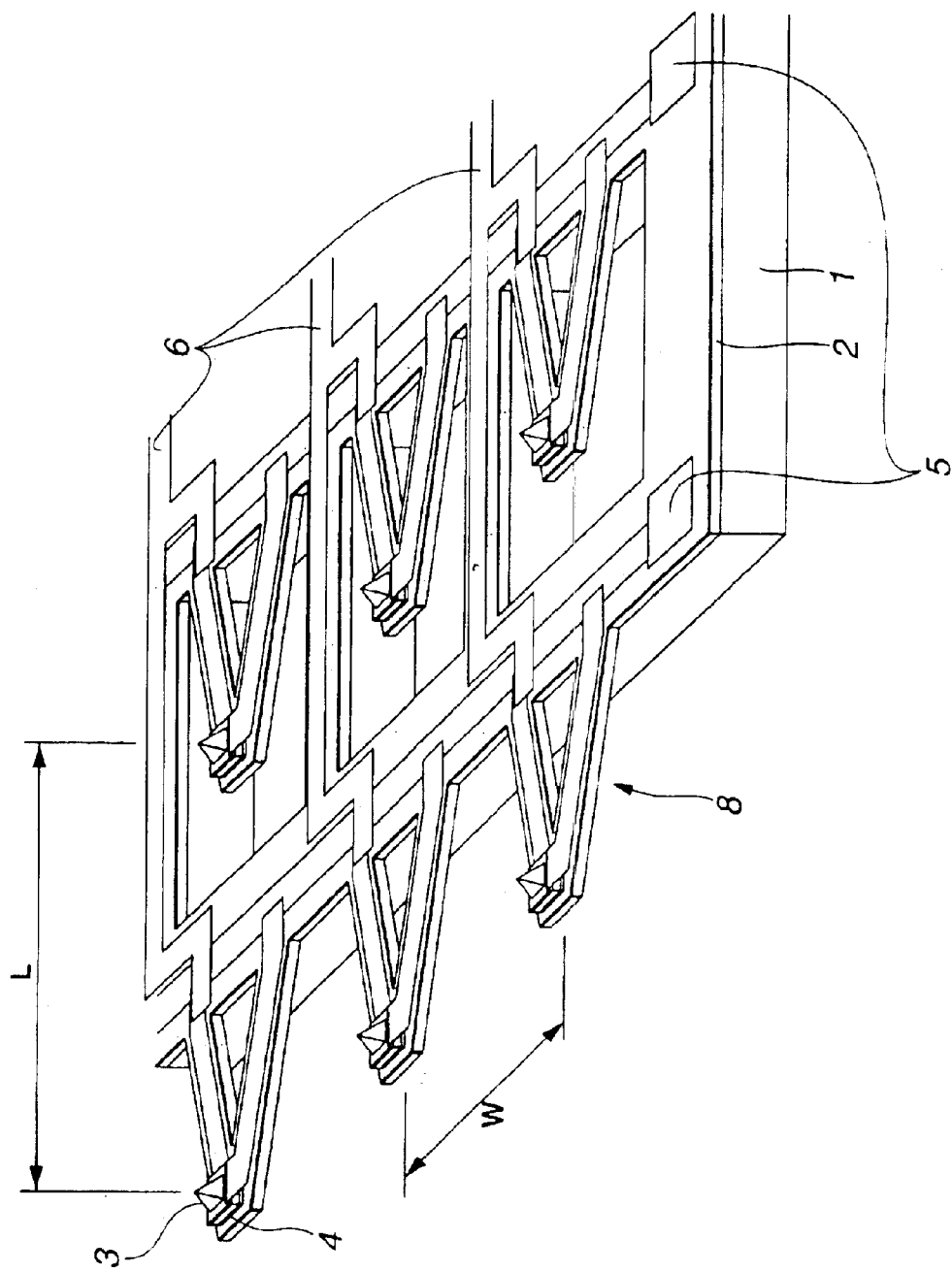
FIG. 9 is a perspective view illustrating a two-dimensional array of light source apparatuses for a near-field optical system according to the present invention.

Actually, the size of the cantilever 8 could be achieved with a width of 50 microns at its tip portion, a width of 100 microns at its root portion, a longitudinal length of 250 microns and a lateral interval W of 125 microns between SNOM heads. This schematic structure is illustrated in FIG. 9. A longitudinal interval L of the structure is 500 microns due to the length of the cantilever 8 and a region of the supporter of the Si substrate 1. Further, the electrode wiring 5 and 6 for injecting current into the surface emitting laser 4 of each SNOM head is built in a matrix-wiring pattern, as illustrated in FIG. 9. Alternatively, the wiring for independently driving those lasers 4 may also be formed.

When the multi-lever structure of this embodiment is used for high-density recording, super-fine optical exposure or the like, each SNOM head is placed on each corresponding track and the entire multi-lever structure is oriented at a slight angle relative to the scanning direction. Alternatively, when the information reproduction is performed right after the information recording, the entire multi-lever structure is parallel to the scanning direction in order to position front and rear SNOM heads (SNOM heads on right and left sides in FIG. 9) on the same track.

(Third Embodiment)

Figure 10A:
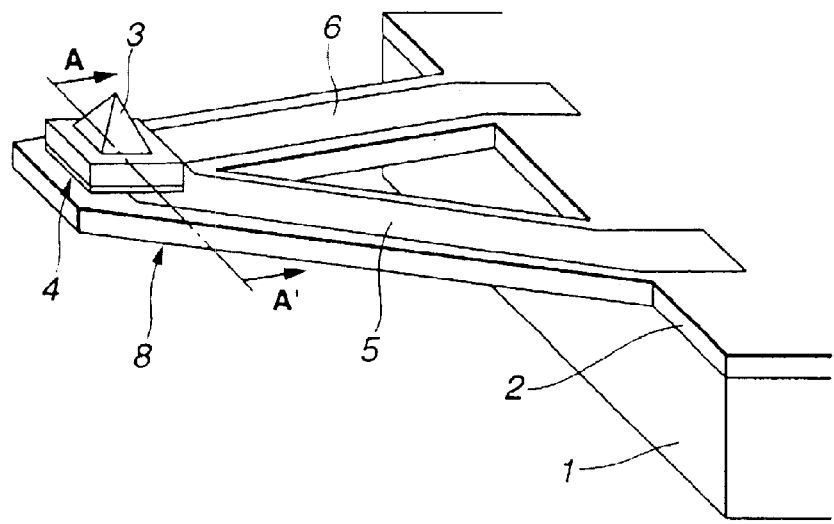
FIG. 10A is a perspective view illustrating a third embodiment of a surface-type optical apparatus according to the present invention, which is directed to a light source apparatus for a near-field optical system.
Figure 10B:
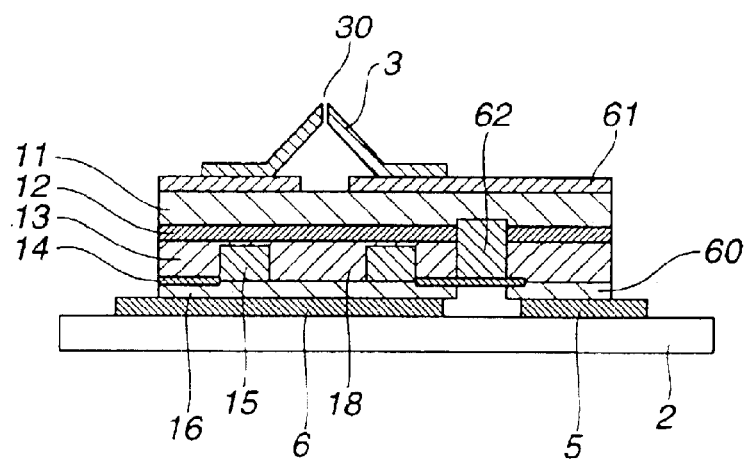
FIG. 10B is a cross-sectional view illustrating the third embodiment, taken along a line A–A' of FIG. 10A.

A third embodiment is directed to a structure in which both the p-side electrodes 16 and an n-side electrode 60 are provided on the same side, on which the surface emitting laser 4 is bonded to the cantilever 8, and no electrode is formed on the stepped portion of the laser 4 as illustrated in FIGS. 10A and 10B. In FIGS. 10A and 10B, the same reference numerals as those in FIGS. 5A and 5B denote portions having the same functions as those of portions in FIGS. 5A and 5B.

In the third embodiment, as illustrated in FIG. 10B—a cross-sectional view of FIG. 10A taken along a line A–A'—a groove is formed outside a region of the surface emitting laser 4, the groove is buried with a polyimide 62, and the n-side electrode 60 is formed on the p-DBR layer 13. On the light-taking side, a metal layer 61 of Ti/Pt/Au or the like is formed as a light-blocking layer not as an electrode, and a window is formed in the metal layer 61. Further, in order for the n-side electrode 60 to act as an n-side electrode on the side of the n-DBR mirror 11, a high voltage of about 10 V is applied between the metal layer 61 and the n-side electrode 60 to break the p–n junction and create a resistance between p-DBR mirror 13 and n-DBR mirror 11.

When the n-side electrode 60 is also electrically connected to the electrode wiring 5 on the cantilever 8, two electrodes 16 and 60 can be formed on the same side. Accordingly, there is no need to form the electrode on the stepped portion as in the first and second embodiments, leading to solution of the problem that yield is lowered due to electrode breakdown and the like.

Figure 10C:
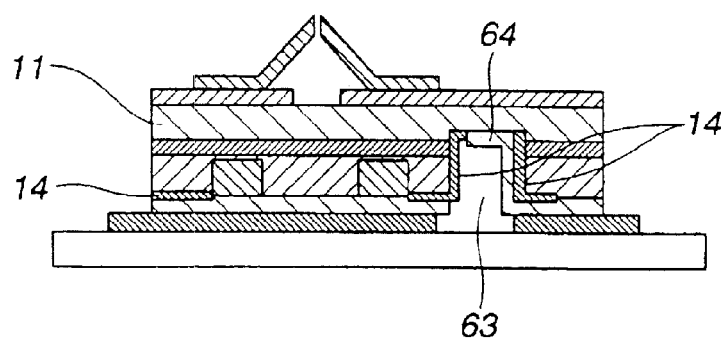
FIG. 10C is a cross-sectional view illustrating a modification of the third embodiment, taken along a line A–A' of FIG. 10A.

There are some other methods of forming the structure in which both electrodes are arranged on the same plane. For example, as illustrated in FIG. 10C, a groove 63 is formed down to the n-DBR mirror 11 and an n-side electrode 64 is extended into the groove. 63 to achieve the wiring. In this case, the insulating layer 14 is formed at a necessary location under the n-side electrode 64. Here, the process of breaking the p–n junction can be omitted.

(Fourth Embodiment)

Figure 11:
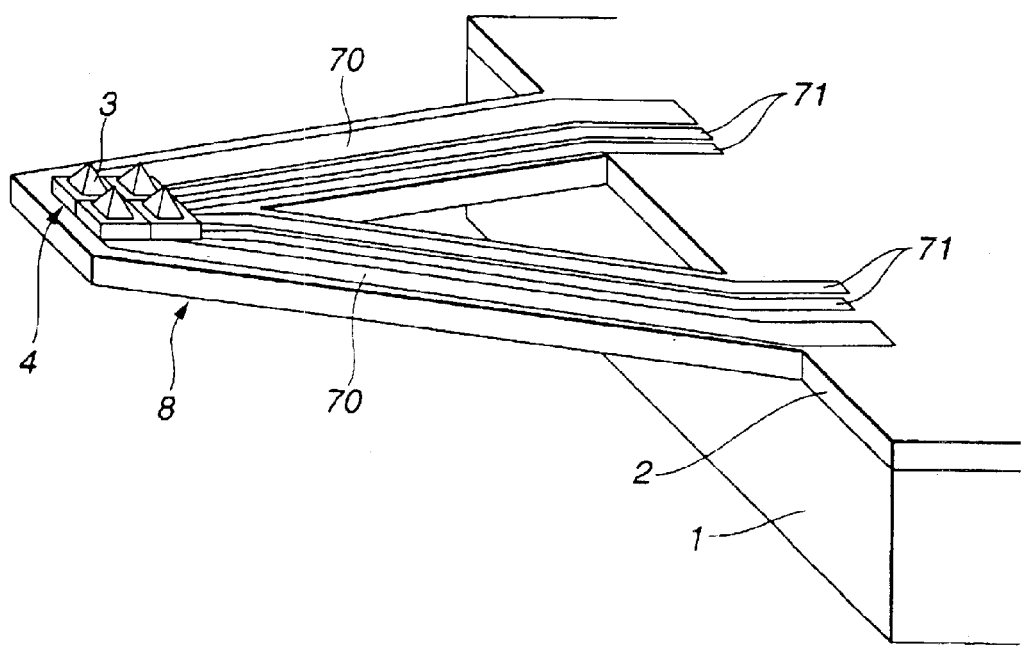
FIG. 11 is a perspective view illustrating a fourth embodiment of a surface-type optical apparatus according to the present invention, which is directed to a light source apparatus for a near-field optical system.

A fourth embodiment is directed to a structure in which a plurality of surface emitting lasers 4 and the protrusion members 3 with the minute opening 30 are provided on a single cantilever 8. In FIG. 11, the same reference numerals as those in FIG. 5A denote portions having the same functions as those of portions in FIG. 5A.

In the fourth embodiment, illustrated in FIG. 11, a two-dimensional (2×2) array of the lasers 4 is arranged at intervals of 50 microns, the protrusion members 3 are bonded to light emission surfaces of the lasers 4, respectively, and the formed SNOM head is mounted on the cantilever 8. The wiring to each surface emitting laser 4 is built in such a manner that both electrodes of each laser 4 are led to the same side as in the third embodiment and a common electrode wiring 70 and each signal line 71 are connected to those electrodes of each laser 4, respectively. Thus, the four surface emitting lasers 4 can be driven independently.

Other structures and the fabrication process are the same as those of the first, second and third embodiments.

The above structure is applicable to scanning at fine pitches and a high-speed operation. Furthermore, all the devices need not be used as SNOM light sources; some may be used as a detector or a light source for tracking, for example. A surface-type photodetector with a structure similar to the above surface emitting laser but without any DBR mirrors may be integrated into the devices.

(Fifth Embodiment)

Figure 12A:
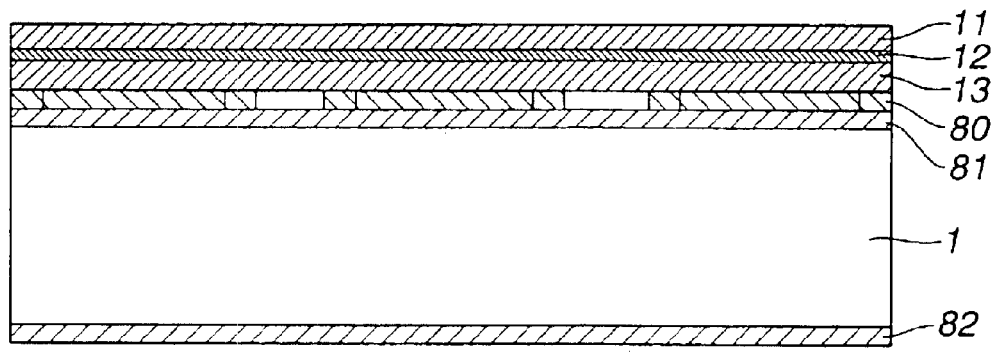
FIGS. 12A–12C are cross-sectional views illustrating fabrication steps of a fabrication method for a fifth embodiment of a surface-type optical apparatus according to the present invention, which is directed to a light source apparatus for a near-field optical system.
Figure 12B:
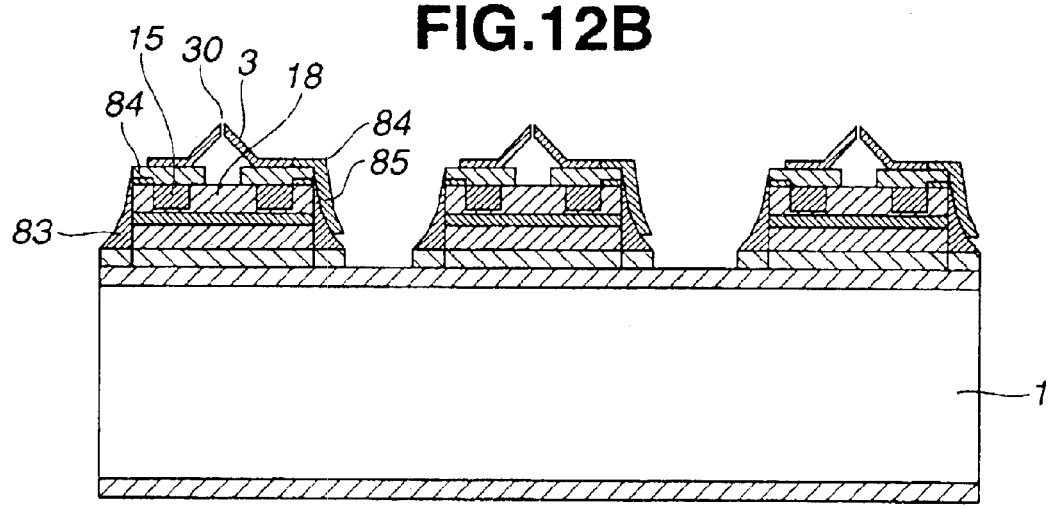
Figure 12C:
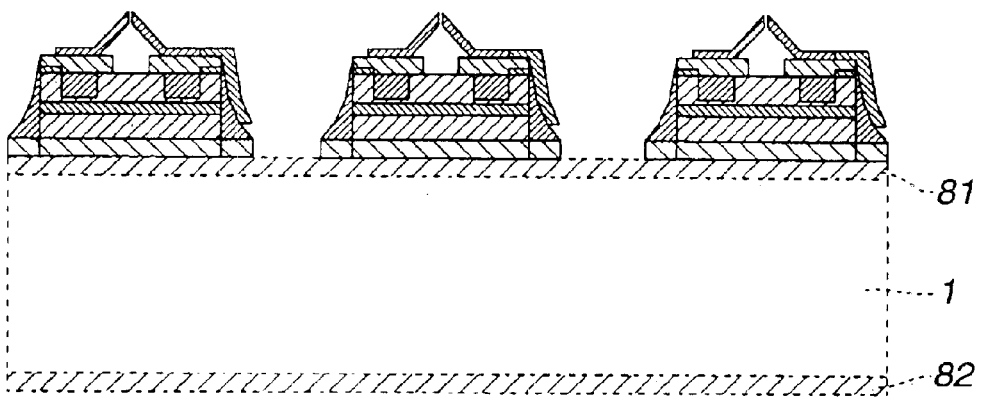

In all of the above embodiments, the light radiation region and the electrodes are fabricated on the growth substrate for the laser, and the electric connection is then accomplished between the electrode and the electrode wiring. In a fifth embodiment, however, the laser wafer is directly bonded on the cantilever substrate before the laser substrate is processed, and the surface emitting laser is processed after the laser substrate of GaAs is removed. Since the bonding is carried out without the electrodes, a thin Si layer 80 of an SOI substrate is used as the cantilever and a direct solid-phase junction on atomic levels is conducted between Si and GaAs. Further, the Si layer 80 is caused to have an electric conductivity such that the n-side electrode wiring can be omitted. In FIGS. 12A to 12C, the same reference numerals as those in FIGS. 8A to 8C denote portions having the same functions as in the latter.

FIGS. 12A to 12C illustrate the fabrication process of the fifth embodiment. The SOI substrate used in the cantilever processing consists of the Si layer 80 with a thickness of 1 micron, an $SiO_2$ layer 81 with a thickness of 0.5 microns, and the Si substrate 1 with a thickness of 500 microns.

As illustrated in FIG. 12A, the Si layer 80 is shaped into a pattern of the cantilevers by photolithography and dry etching using $SF_6$. The lever portion of Si thin layer 80 is doped with B (boron) to make it (p-doped Si) well conductive. An $SiN_x$ layer 82 is formed on the bottom surface of the SOI substrate 1 and shaped into the pattern of a mask for etching the Si substrate 1.

Then, the following structure is prepared. The structure includes an n-doped $Al_yGa_{(1-y)}As$ (y=0.3) with a thickness of 0.1 micron. (not shown), the n-doped AlAs/AlGaAs DBR mirror 11, the one-wavelength cavity 12, consisting of AlGaAs/GaAs MQW active layer and AlGaAs spacer layer, and the p-doped AlAs/AlGaAs DBR mirror 13 and p-doped GaAs contact layer grown on the n-GaAs substrate (not shown). A surface of the growth layer, i.e., the p-GaAs contact layer, of this structure is directly bonded to the p-Si layer 80 of the cantilever, and annealing is performed at 600° C. in a hydrogen atmosphere. After that, the GaAs substrate is etched using a liquid mixture of ammonia and hydrogen peroxide solution until the n-doped $Al_yGa$ (1–y)As (y=0.3) layer appears. The GaAs substrate is thus completely removed.

As illustrated in FIG. 12B, the current injection or light radiation region 18 of the surface emitting laser is processed to form the polyimide burying region 15, an n-side electrode 84 with a window and so forth. Then, the AlGaAs/GaAs growth layers outside of the surface emitting laser portion on the cantilever tip are removed by photolithography and etching using a liquid mixture of sulfuric acid, hydrogen peroxide solution and water. In order to form the n-side electrode wiring, an insulating layer 83 of photosensitive polyimide is formed on a portion of the cantilever, the stepped end face of the laser is smoothed, and a wiring pattern 85 of Ti/Au, or the like, is formed by the lift-off. Here, the insulating layer 83 may be formed of SiN, phosphosilicate glass (PSG) or the like. When the impurity concentration of the Si layer 80 is low and its resistance is high, the insulating layer 83 can be omitted. Thereafter, the protrusion member 3 with the minute opening 30 is bonded on the n-side electrode 84.

As illustrated in FIG. 12C, the Si substrate 1 is etched with $SiN_x$ layer 82 used as a mask, and the $SiO_2$ layer 81 is removed. The processing is thus completed.

Figure 13:
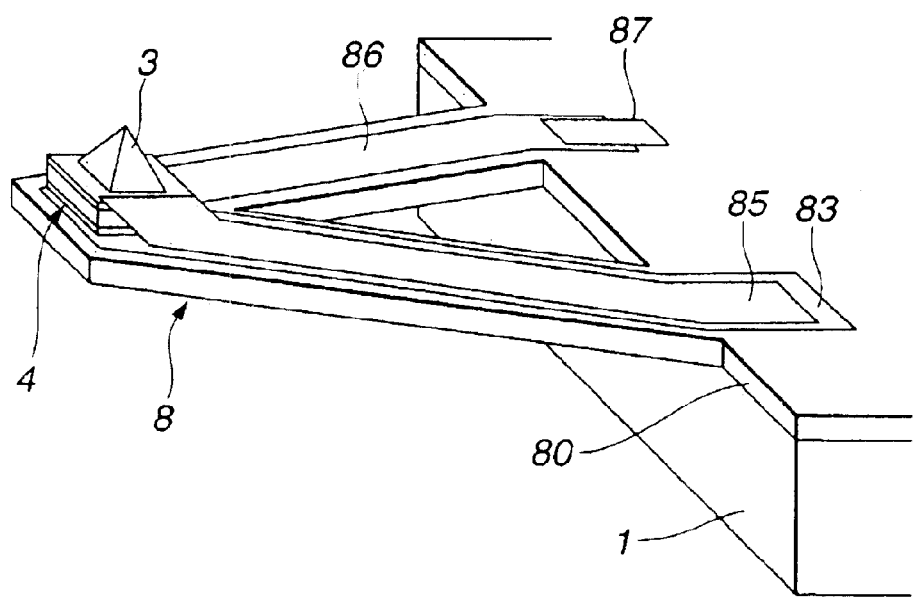
FIG. 13 is a perspective view illustrating the fifth embodiment.

The SNOM head of this embodiment is illustrated in FIG. 13. Here, only one head is shown. The p-side electrode wiring is achieved by doping the Si layer 80 of the SOI substrate with p-type dopant 86, and the wiring in a region of the Si substrate 1 for supporting the cantilever 8 is achieved by an electrode 87 of Cr/Au or the like.

In the fifth embodiment, the laser 4 is bonded on the tip of the cantilever 8 using the solid-phase junction between Si and GaAs. Accordingly, bonding intensity and endurance are superior to those of the first to fourth embodiments in which pressure bonding is conducted between the electrode and the electrode wiring, or an adhesive is used. Also, the metal wiring can be partially omitted in the fifth embodiment, reducing weight. The lever of the Si layer 80 also improves strength and endurance of the structure.

(Sixth Embodiment)

Figure 14A:
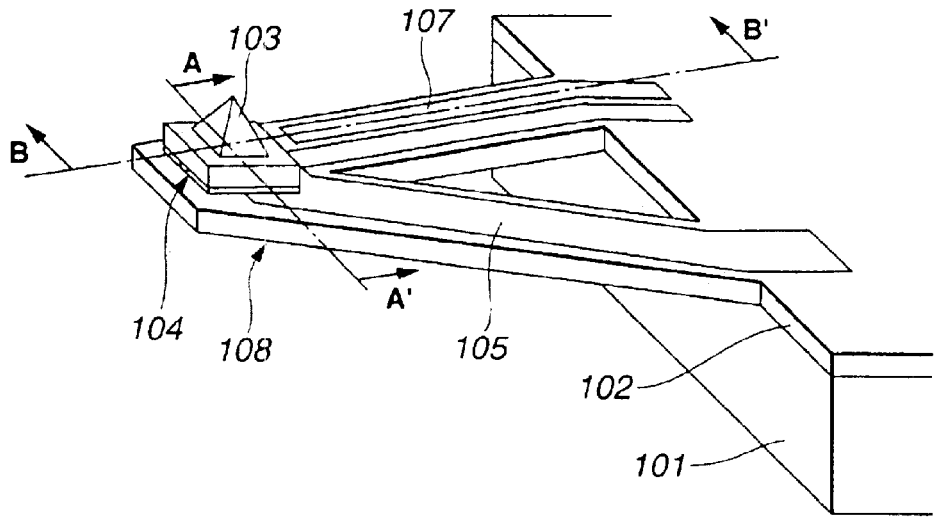
FIG. 14A is a perspective view illustrating a sixth embodiment of a surface-type optical apparatus according to the present invention, which is directed to a light source apparatus for a near-field optical system.
Figure 14B:
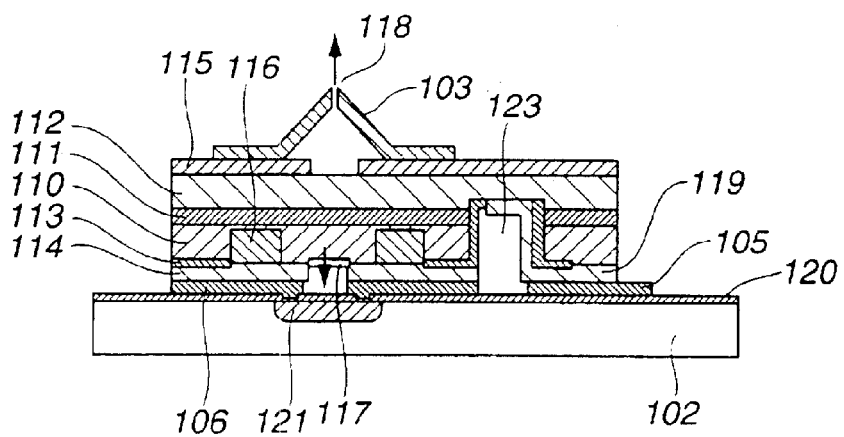
FIG. 14B is a cross-sectional view illustrating the sixth embodiment, taken along a line A–A' of FIG. 14A.
Figure 14C:
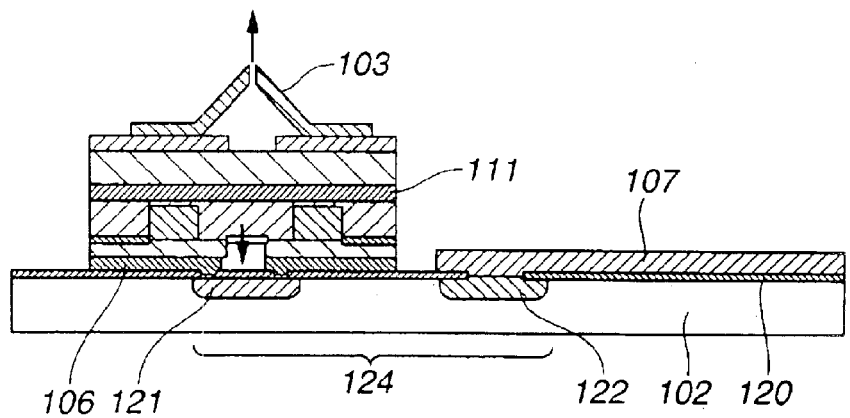
FIG. 14C is a cross-sectional view illustrating the sixth embodiment, taken along a line B–B' of FIG. 14A.

FIGS. 14A to 14C illustrate a SNOM head of a sixth embodiment. The SNOM head includes a surface emitting laser, a protrusion member with a minute opening, which is formed on the epitaxial layer surface of the laser, a photodetector for monitoring light from the laser and a cantilever on a tip of which the lasers are integrally mounted together with the protrusion member and the photodetector.

As illustrated in FIG. 14A (a perspective view) and FIG. 14B (an A–A' cross-sectional view of FIG. 14A), a surface emitting laser 104 used in this embodiment includes a one-wavelength cavity 1111 consisting of an AlGaAs/GaAs MQW active layer and an AlGaAs spacer layer, and p-type and n-type DBR mirrors 110 and 112 consisting of multiple (about twenty (20) to thirty (30) pairs) AlAs/AlGaAs layers of a ¼-wavelength thickness and sandwiching the cavity 111. Those layers are epitaxially grown on an n-GaAs substrate (not shown) by the MOVPE, for example. An uppermost layer of the DBR mirror 110 consists of a highly-doped p-GaAs layer to obtain an easy electrode contact. To form the current constricting structure (which has a diameter of 15 microns in this embodiment) in the light radiation region, an annual etching is conducted down to the neighborhood of the active layer and the etched annular recess is buried with a polyimide 116 to flatten the surface. An insulating layer 113 of SiNx or the like is formed, as illustrated in FIG. 14B, and a p-side electrode 114 with a window for taking light (formed of Cr/Au or the like) is laid down on and around the insulating layer 113.

In the sixth embodiment, the p-side electrode 114 is bonded to a tip portion of an electrode wiring 106 formed on one arm of a cantilever 108 formed of an Si thin layer 102, using, for example, the pressure bonding. On the other hand, the GaAs growth substrate is removed to expose the DBR mirror 112, and a Ti/Au thin layer 115 with a window for taking light is formed on the exposed layer of the DBR mirror 112. If the surface emitting laser 104 needs to be insulated from the surface of a medium when used, an insulating layer (not shown) only needs to be inserted between the DBR mirror 112 and the metal layer 115.

A protrusion member 103 of a tetrahedral shape with a minute opening 118 on its tip is mounted on the light emission surface of the surface emitting laser 104 by the pressure bonding between metals. The protrusion member 103 is formed of an Au foil, for example. Evanescent light leaks through the minute opening 118. The minute protrusion member 103 is used in this embodiment, but in place thereof the entire light emission surface may be covered with an electrode and a minute opening may be formed at its center.

An n-side electrode 119 of the laser 104 is formed as follows. A groove 123 is formed at the periphery of the laser 104 below the active layer, and the L-shaped n-side electrode 119 of Ti/Pt/Au or the like is formed as illustrated in FIG. 14B. The n-side electrode 119 is connected to an electrode wiring 105 formed on the other arm of the cantilever 108 by the pressure bonding or the like.

A current injection into the laser 104 is carried out through the wiring of the electrode patterns 105 and 106 formed on the trapezoidal cantilever 108 whose central portion is removed. The electrode patterns 105 and 106 can also be electrically connected to the electrodes 119 and 114 of the surface emitting laser 104, respectively, by using electrically-conductive adhesive or solder bump.

The cantilever 108 is composed of the Si thin layer 102 of the SOI substrate in which the Si thin layer 102 is formed on an Si substrate 101 through an $SiO_2$ layer. The SNOM head is supported by this elastic supporter of the Si thin layer 102.

A photodiode 124 is integrated in a region of the Si lever 108 to which light from the surface emitting laser 104 is applied. The photodiode 124 has a structure wherein n-diffused region 121 and $p^+$-diffused region 122 are formed in the Si thin layer 102 with a sufficiently low impurity concentration, and the n-side electrode and wiring pattern 106 and a p-side electrode 107 are formed on an insulating layer 120 of SiN or the like. The electrode p-side 107 also serves as an electrode wiring on the lever 108.

The light output of the surface emitting laser 104 emitted to the side of the cantilever 108 enters the $n^+$-region 121 and generates optical carries therein. Photo-current is detected by applying a reverse voltage between the electrodes 106 and 107. Here, an excessively strong light output is likely to saturate the photodiode 124. Hence, a light attenuating layer 117 of an Au thin layer or the like (about 200 A in thickness) needs to be formed on the light emission surface on the side of the cantilever 108.

The photodiode (PD) 124 is composed of a pin-PD structure in this embodiment, but other structure such as avalanche photodiode (APD), metal-semiconductor-metal Schottky photodiode (MSM-PD) or field effect transistor photodiode (FET-PD) can also be used.

In this embodiment, the size of the surface emitting laser chip is 50 microns×50 microns, a side length of the bottom of the protrusion member 103 with the opening 118 is 20 microns, and a diameter of the minute opening 118 is several tens of nanometers. The cantilever 108 has a trapezoidal shape with a tip portion of 80 microns, a root portion of 125 microns and a length of 250 microns. Its central portion of a triangular shape is removed as illustrated in FIG. 14A.

Figure 17:
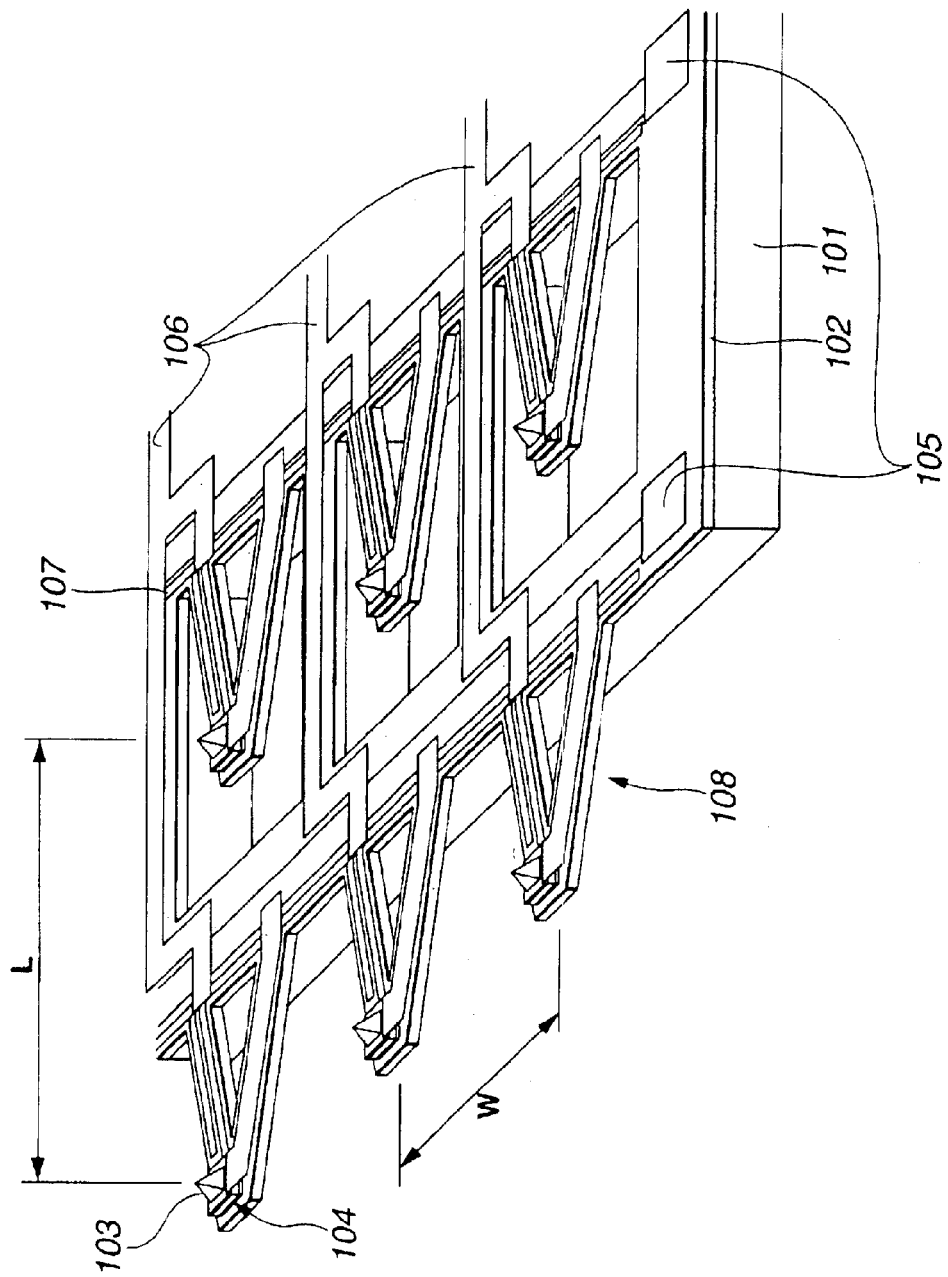
FIG. 17 is a perspective view illustrating a two-dimensional array of light source apparatuses for a near-field optical system according to the present invention.

Arrayed SNOM heads are illustrated in FIG. 17. A lateral interval W of this array is 125 microns, and a longitudinal interval L of the structure amounts to 500 microns due to the length of the cantilever 108 and a region of the supporter of the Si substrate 101. Further, the wiring for injecting current into the surface emitting laser 104 of each SNOM head and the wiring for detecting the photo-current in the photodetector 124 are formed in the form of a matrix wiring, as illustrated in FIG. 17, respectively. A wiring for independently driving those devices may also be used. Since the SiN layer 120 and metal layers 105 and 106 are formed on the Si lever 101, warp may occur due to a difference in their thermal expansion coefficients. When the warp needs to be eliminated, the wiring structure can be formed by the doping of the Si lever 102 to omit the SiN and the metal layers.

The fabrication process of the SNOM head of this embodiment will be described with reference to FIGS. 15A through 15C, which are cross-sectional views taken along a line A–A' in FIG. 14A. The SOI substrate used for the construction of the cantilever is composed of the Si layer 102 with a thickness of 1 micron, an $SiO_2$ layer 125 with a thickness of 0.5 microns, and the Si substrate 101 with a thickness of 500 microns.

Figure 15A:
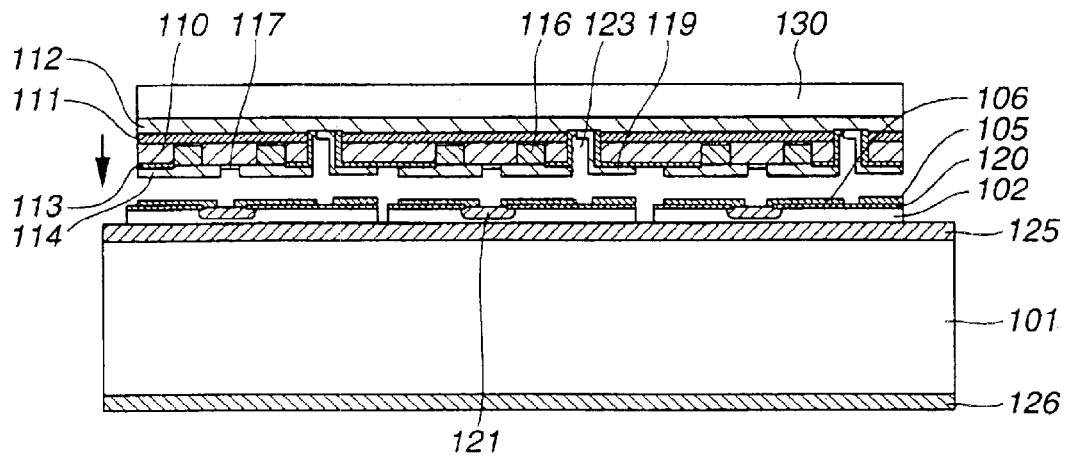
FIGS. 15A–15C are cross-sectional views illustrating fabrication steps of a fabrication method for the sixth embodiment.
Figure 15B:
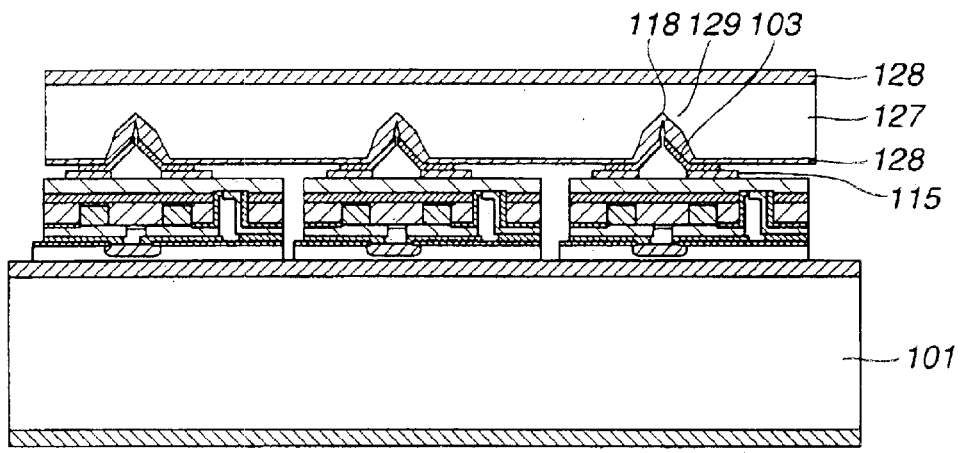

As illustrated in FIG. 15A, the $n^+$-doped layer 121 and p-doped layer (see the layer 122 in FIG. 14C) are formed at a portion of the cantilever 108 in the Si layer 102 by ion injection or the like, and the $SiN_x$ layer 120 with a thickness of 0.1 micron is formed as the insulating layer. After an opening is formed in the contact region, the wiring 105 for the n-side electrode of the laser, the n-side electrode 106 of the photodetector and the p-side electrode 107 of the photodiode (see the electrode 107 in FIG. 14C) are formed as the electrode and wiring pattern by, for example, photolithography and lift-off. After that, the insulating layer 120 and the silicon layer 102 are shaped into a pattern of the cantilever by photolithography and dry etching using $SF_6$. An $SiN_x$ layer 126 is formed on the bottom surface of the SOI substrate at the same time when the insulating layer 120 on the Si thin layer 102 is shaped into a pattern of the mask for etching the Si substrate 101.

Then, an $n-Al_yGa_{(1-y)}As$ (y=0.3) with a thickness of 0.1 micron (not shown), the n-AlAs/AlGaAs DBR mirror 112, the one-wavelength cavity 111 consisting of AlGaAs/GaAs MQW active layer and AlGaAs spacer layer, the p-AlAs/AlGaAs DBR mirror and p-GaAs contact layer 110 are grown on an n-GaAs substrate 130. To form the current constricting structure in the light radiation region, an annual etching is conducted by photolithography and RIBE of $Cl_2$ series and the etched annular recess is then buried with the polyimide 116 to flatten the surface. The insulating layer 113 of $SiN_x$ with the window is formed, and the p-side electrode 114 with the window for light emission is likewise formed. Then, the Au thin layer 117 for attenuating light is deposited. Further, after the groove 123 for leading the n-side electrode is formed by RIBE, the insulating layer 113 is formed on the side wall of the etched groove 123 and the L-shaped n-side electrode 119 is formed thereon.

The p-side electrode 114 and the n-side electrode 119 are aligned with and bonded to the electrode 106 and the electrode 105, respectively, to achieve the electric conduction therebetween.

As illustrated in FIG. 15A, the GaAs substrate 130 is etched using a liquid mixture of ammonia and hydrogen peroxide solution, and the substrate 130 is thus completely removed until the $n-Al_yGa_{(1-y)}As$ layer (y=0.3) is exposed. If necessary, an insulating layer is formed on the exposed surface. After that, the metal layer 115 of Ti/Au or the like with the light-taking window is formed for bonding. The AlGaAs/GaAs growth layers outside of the surface emitting laser portions 104 at the tip portions of the cantilevers are removed by photolithography and etching using a liquid mixture of sulfuric acid, hydrogen peroxide solution, and water. The devices are thus separated from each other.

Further, the minute protrusion member 103 with the minute opening is formed on another substrate 127. The protrusion member 103 is aligned with the surface emitting laser 104 and bonded on its light emission surface while applying pressure. Upon separating the another substrate 127, the protrusion member 103 is separated from the interface of a stripping compound layer 128 around a pyramid-shaped recess 129. Only the protrusion member 103 is thus left on the laser 104. The fabrication method of the protrusion member 103 is described in the first embodiment.

Figure 15C:
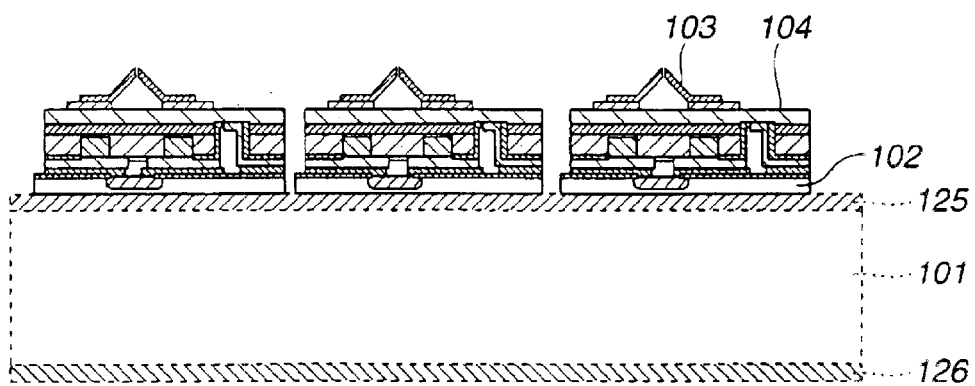

As illustrated in FIG. 15C, polyimide is spin-coated on the substrate surface to form a protective layer, and the substrate 101 is etched from its bottom surface with the SiN, layer 126 on the bottom surface acting as an etching mask, using a 30% potassium hydroxide solution heated to 90° C. Then, the $SiO_2$ layer 125 is removed by wet etching of hydrofluoric acid series. Finally, the above surface protective layer is etched by oxygen plasma RIE, and the cantilever-type SNOM head is thus achieved.

Figure 21:
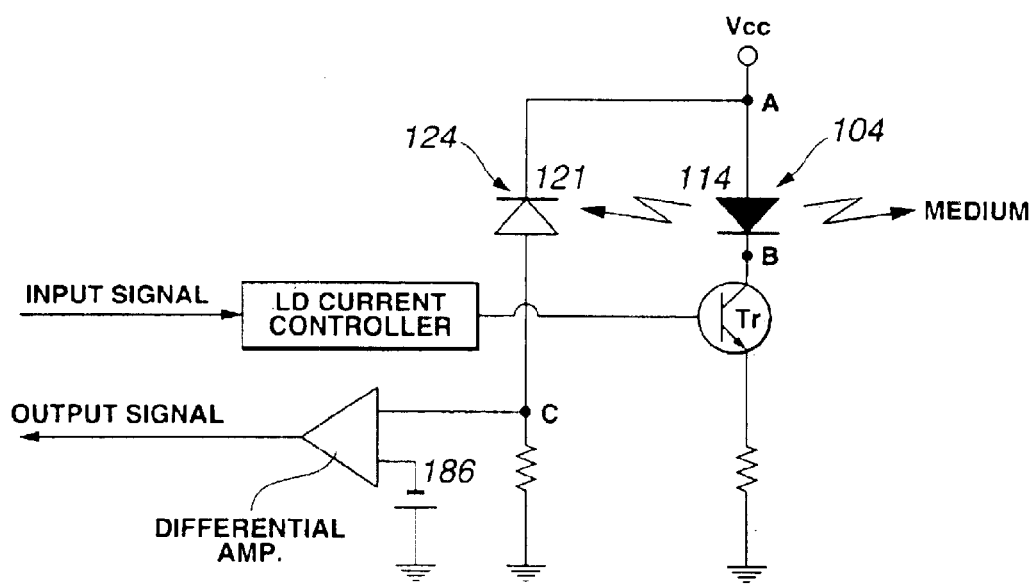
FIG. 21 is a view illustrating a driving method for a surface-type optical apparatus according to the present invention.

The driving method of the thus-fabricated SNOM head will be described with reference to FIG. 21. The anode 114 of the surface emitting laser 104 and the cathode 121 of the photodetector 124 are connected to be a common electrode 106, and the common electrode is connected to an electric power source Vcc through a point A. The electrode 105 on the side of the laser 104 is connected to a transistor (the bipolar type is illustrated in FIG. 21, but an FET may also be used) for driving the laser through a point B. Here, an LD current controller controls a current injected into the laser 104 on the basis of an input signal, such that the output of evanescent light from the laser 104 can be controlled. The anode electrode 107 of the photodetector 124 is connected to the ground through a point C and a resister. A signal is taken as an output of a differential amplifier by comparing a voltage change at the point C with a reference voltage 186.

When information is to be taken from a medium, the current of the laser 104 is set close to its threshold and the information is taken as the voltage signal from the photodetector 124, which reflects a change in the oscillation condition of the laser 104 caused by light returned from the medium. The system of FIG. 21 can also read a DC signal, but the system may be modified by a capacitor connection, such that only an AC component can be taken. Further, in order to improve the S/N, the laser 104 may be modulated with a predetermined frequency and the optical detection of a synchronous detection may be conducted. In such a driving method, when the medium is grounded and electrically conductive, an electric isolation is needed between the cathode (point B) of the laser 104 and the medium. Therefore, it is preferable to insert the above insulation layer between the metal layer 115 and the DBR mirror 112.

Another driving method, however, can be performed without the above insulating layer. When the minute protrusion member 103 with the minute opening, 118 is connected to the cathode (n-side) electrode, the protrusion member 103 can be brought into contact with a medium surface, which is to be observed or in which information is to be recorded, to cause a current to flow into the medium for tracking or the like. Alternatively, the protrusion member 103 is not completely brought into contact with the medium to cause a tunnel current, and thus the device can also function as a scanning tunnel microscope (STM).

When an electric power source is connected between the medium surface and the p-side electrode 106 of the laser 104 and the laser 104 is driven by injecting a current thereinto through the protrusion member 103 without connecting the wiring 105 to the n-side electrode, the light output of the surface emitting laser 104 is changed depending on the intensity of the tunnel current. Thus, a new method of observing the medium can be performed. In this case, the laser is driven by the tunnel contact of the point B of FIG. 21 with the medium through the protrusion member 103.

In the sixth embodiment described above, a small, highly effective SNOM head with the light source and the photodetector can be readily fabricated. Image observation with a super-high resolving power, optical recording, optical exposure or the like can be conducted using the head.

Also, in this embodiment, surface emitting lasers other than the above laser and elastic supporters other than the above cantilever can be used as described in the first embodiment.

In the sixth embodiment, the light radiation region and electrodes are fabricated on the growth substrate for the laser, and the electric connection is then obtained between the electrode and the electrode wiring. However, the laser wafer can be directly bonded on the cantilever substrate 101 before the laser substrate is processed, and the surface emitting laser can be processed after the laser substrate of GaAs is removed. In this case, the polyimide burying layer is formed in the n-DBR layer 112 in FIG. 14B. As an example of such a junction, there is a method in which the Si thin layer of the SOI substrate is used as the cantilever and a direct solid-phase junction on the atomic level is conducted between Si and GaAs without using electrodes. Its bonding strength and endurance are excellent, and weight can be decreased since the metal wiring can be partly eliminated.

(Seventh Embodiment)

Figure 16:
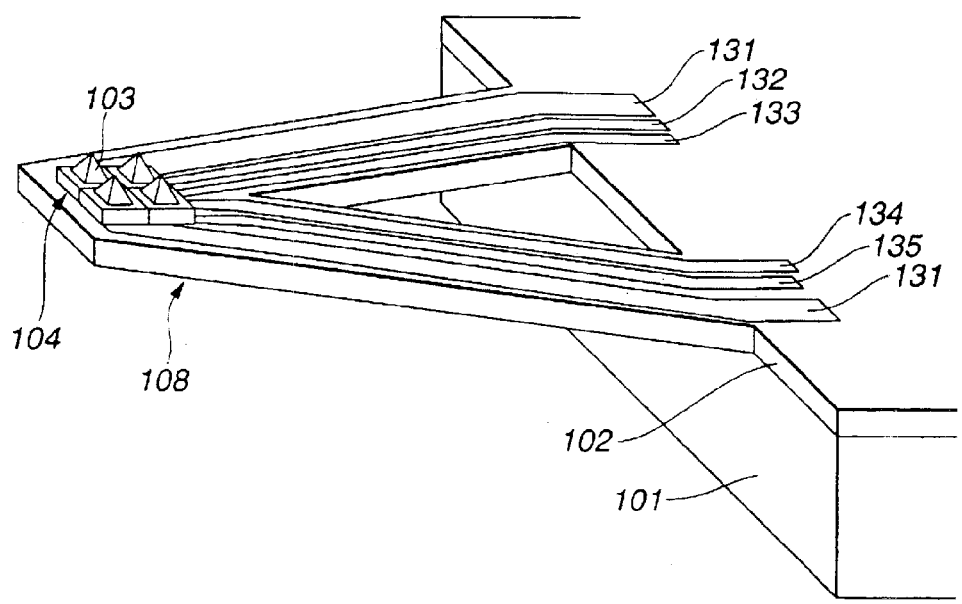
FIG. 16 is a perspective view illustrating a seventh embodiment of a surface-type optical apparatus according to the present invention, which is directed to a light source apparatus for a near-field optical system.

A seventh embodiment is directed to a structure in which a plurality of surface emitting lasers 104, protrusion members 103 with a minute opening and photodetectors 124 are provided on a single cantilever 108 as illustrated in FIG. 16. In FIG. 16, the same reference numerals are used as in FIG. 14A and they denote portions having the same functions as those of the latter.

In the seventh embodiment illustrated in FIG. 16, a Cz 15 two-dimensional (2×2) array of the lasers 104 is placed at intervals of 50 microns, the protrusion members 103 are bonded to light emission surfaces of the lasers 104, respectively, and the resulting SNOM heads are mounted on the cantilever 108. The wiring to each surface emitting laser 104 is formed in such a manner as described in the sixth embodiment that the anode wirings 114 are formed as a common electrode wiring 131 on both arms of the cantilever 108 and electrode wirings 132–135 on the side of the cathode 119 are independently connected to the lasers 104, respectively. As the electrodes for detecting photo-current of the photodiode 124, the p-doped layer is formed in the Si lever 108 and four wiring structures (not shown) are thus formed to perform an independent reading.

Other structures and the fabrication processes are the same as corresponding structures and processes of the sixth embodiment.

The above structure is applicable to scanning at fine pitches and a high-speed operation. Further, all the devices need not be used as SNOM light sources, and a part thereof may be used as a detector or a light source for tracking, for example.

(Eighth Embodiment)

Figure 18:
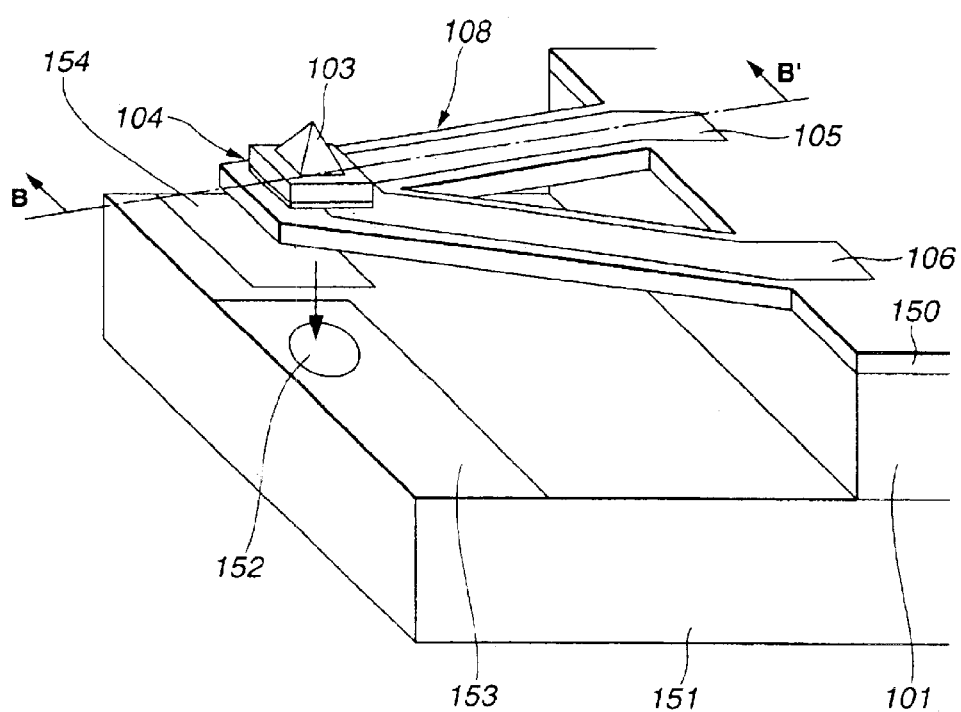
FIG. 18 is a perspective view illustrating an eighth embodiment of a surface-type optical apparatus according to the present invention, which is directed to a light source apparatus for a near-field optical system.

An eighth embodiment is directed to a structure in which a photodetector 152 is arranged at a place slightly away from the cantilever 108 along a direction of the optical axis of the surface emitting laser 104, as illustrated in FIG. 18. In FIG. 18, the same reference numerals are used as those in FIG. 14A and they denote portions having the same functions as those of the latter. In this embodiment, the cantilever 108 can be formed of a 10.15 dielectric material, such as an SiN thin layer 150, but not of a semiconductor, such as the Si thin layer. Therefore, its cost can be reduced compared with the case where the SOI substrate is used.

In the eighth embodiment, electric wires 105 and 106 of the electrode wiring for driving the surface emitting laser 104 are formed on the cantilever 108 of the SiN thin layer 150, and functional layers of the laser 104 with the protrusion member 103 with the minute opening 118 are bonded on the tip of the cantilever 108, similarly to the sixth embodiment. An evanescent wave is generated by the minute opening 118 of the protrusion member 103, and at the same time, light is emitted from the laser 104 transmitting through the SiN lever 108. The light propagates in the air and is received by the photodiode 152 formed on another Si substrate 151. Here, the thickness of the substrate 101 supporting the lever 108 is reduced to about 150 microns by polishing. Therefore, when the emission angle of the surface emitting laser 104 is about ten (10) degrees and the window diameter of its output end is 10 microns, the beam diameter on the light receiving surface is about 40 microns. The window region of the light receiving surface of the photodiode, 152 is hence set to about 100 microns to enable sufficient detection.

In the photodiode 152, the n-type region is a light receiving layer and its photo-current can be detected by the n-side electrode 153 and the p-side electrode 154, as in the sixth embodiment. The substrate 101 is aligned with and bonded to the substrate 151 after the, cantilever 108 is fabricated. Other photodiodes different from the pin-PD can also be used, as described in the sixth embodiment.

The fabrication process of the SNOM head with the photodetector of this embodiment will be described with reference to FIGS. 19A through 19D. FIGS. 19A through 19D are cross-sectional views taken along a line B–B' in FIG. 18. The line B–B' (i.e., one arm of the cantilever 108) extends at a slight angle, so this cross section contains the n-side and p-side electrodes 153 and 154 of the photodiode 152.

Figure 19A:
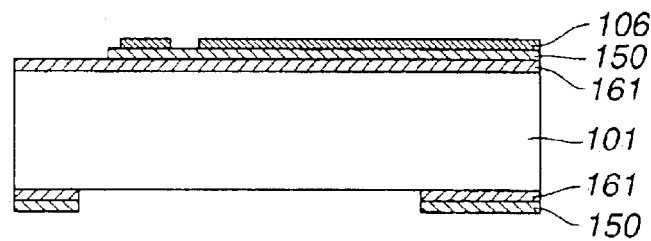
FIGS. 19A–19D are cross-sectional views illustrating fabrication steps of a fabrication method for the eighth embodiment.

As illustrated in FIG. 19A, a silicon dioxide layer 161 with a thickness of 0.3 microns is formed by the thermal oxidization and then a $SiN_x$ layer 150 with a thickness of 0.5 microns is formed on both opposite surfaces of the Si (100) substrate 101 with a thickness of 150 microns by the CVD method. The electrode wiring pattern 106 is then formed on the upper $SiN_x$ layer 150 by the lift-off method. After that, the electrode pattern 106 is shaped into the shape of the cantilever 108 as illustrated in FIG. 18 by photolithography and RIE of $CF_4$ plasma. Then, the SiN 150 and the $SiO_2$ layer 161 on the bottom surface of the substrate 101 are shaped into a mask pattern for the back-etching of the Si substrate 101.

Figure 19B:
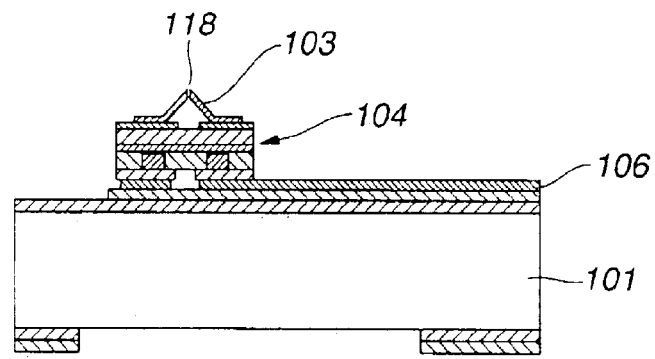

As illustrated in FIG. 19B, the surface emitting laser 104 is bonded on the electrode 106 by the method described in the sixth embodiment. After that, the laser 104 is cut down to a size of 50 microns×50 microns by photolithography and wet etching of sulfuric acid series. Here, since an array of the surface emitting lasers 104 is formed on the GaAs substrate at intervals corresponding to bonding places on the cantilever 108, the Si substrate 101 and the GaAs substrate for the lasers only need to be simply handled. Further, using the method described in the sixth embodiment, the protrusion member 103 with the minute opening 118 formed on another substrate 127 is bonded on the light emission surface of the laser 104 on the cantilever 108 by applying pressure.

Figure 19C:
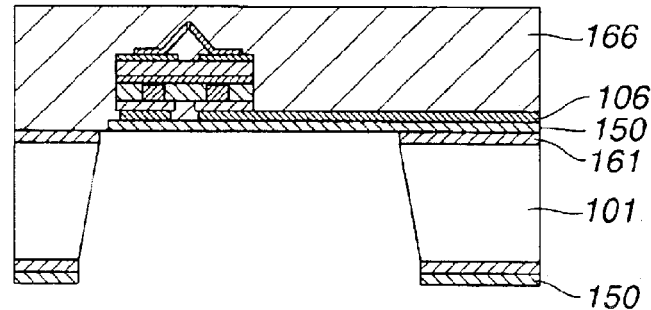

As illustrated in FIG. 19C, polyimide is spin-coated on the substrate surface to form a protective layer 166, and the substrate 101 is then etched from its bottom surface with the SiN layer 150 on the bottom surface acting as an etching mask, using a 30° potassium hydroxide solution heated to 90° C. Then, the $SiO_2$ layer 161 is removed by wet etching of hydrofluoric acid series.

Figure 19D:
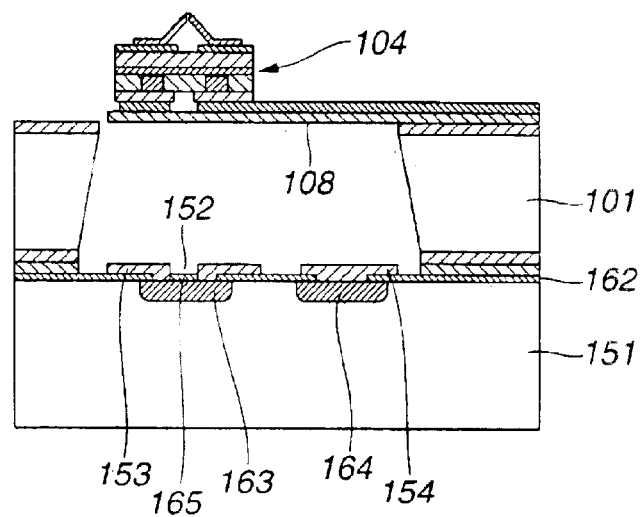

As illustrated in FIG. 19D, after n-diffused layer 163 and p-diffused layer 164 are formed in the Si substrate 151 and an insulating layer 162 is formed thereon, electrode wiring patterns 153 and 154 are formed. An insulating and antireflection layer 165 is formed on the light receiving surface. The Si substrate 151 is aligned with and bonded to the substrate 101 with the cantilever 108 by the solid-phase junction or by an adhesive. Finally, the above surface protective layer 166 is etched by oxygen plasma RIE, and the cantilever-type SNOM head, as-illustrated in FIG. 18, is thus obtained.

The SNOM head of this embodiment can also be driven as described in the sixth embodiment. Additionally, this head can be driven by the following driving methods. Since a beam from the surface emitting laser 104 on the cantilever 108 can be deflected due to the deformation of the lever 108, an image observation can be performed by using this characteristic in a manner similar to the atomic force microscope (AFM). In this case, the light receiving surface of the photodetector 152 is reduced to about 40 microns, and the phenomenon is utilized such that the location of the beam shifts on the light receiving surface-due to the deflection of the lever 108 and the intensity of detected light is changed. This signal can be isolated, by frequency separation, from a signal of information on the surface of a medium detected due to the fluctuation in output light of the laser 104 resultant from the interaction of near-field light, as in the sixth embodiment. That is, the fluctuation in the optical signal due to the beam deflection corresponds to a mechanical vibration of the lever 108, and therefore causes a signal with a frequency lower than the fluctuation in the output of the laser 104. As the method for detecting the beam deflection, there also exists a method in which small light receiving surfaces with a size of about 10 microns are linearly arranged to detect the beam location. When the head is driven by such a method, near-field observation and AFM observation can be simultaneously achieved such that the medium can be observed from different aspects.

(Ninth Embodiment)

Figure 20:
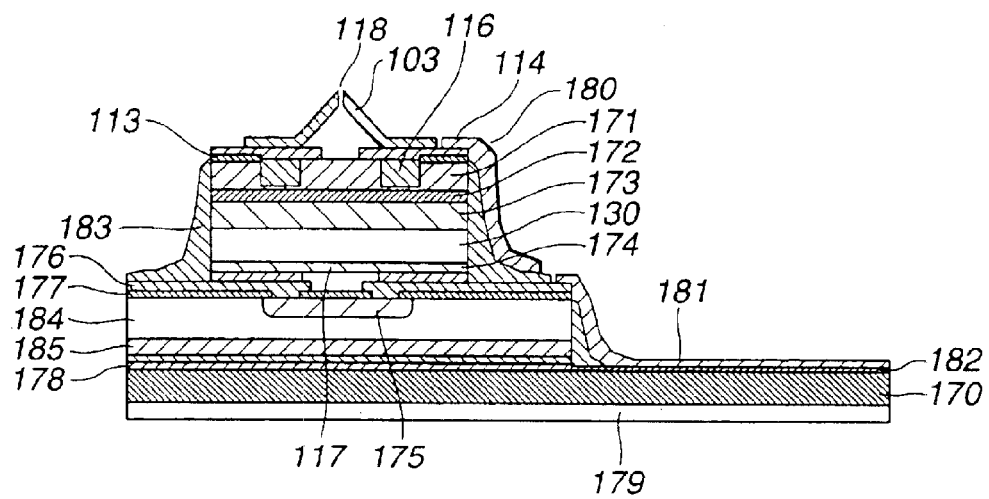
FIG. 20 is a cross-sectional view illustrating a ninth embodiment of a surface-type optical apparatus according to the present invention, which is directed to a light source apparatus for a near-field optical system.

A ninth embodiment is directed to a structure in which a photodetector is formed integrally with the surface emitting laser with its growth substrate and is bonded to a thick cantilever. FIG. 20 illustrates its structure. In FIG. 20, portions having the same functions as those of the sixth embodiment, are designated by the same reference numerals as those in FIGS. 14A through 14C.

In the ninth embodiment, the surface emitting laser is composed of materials of a 0.98 band microns, and light can be taken through the GaAs substrate 130. Therefore, the process of removing the laser substrate 130 can be omitted. The cantilever is made of a thick metal layer 170 with a thickness of about 20 microns to increase its strength, because a relatively heavy device is mounted on the cantilever tip. This lever is formed as follows. After a Cr/Au electrode (an electrode for electroplating) having the shape of the cantilever is formed on an SiN layer 179 by the lift-off or the like, the thick metal layer 170 is formed by Ni wet plating. Other than Ni, the plating material may be Cu, Au or the like. Here, the substrate 130 for the surface emitting laser has a thickness of 80 microns, and a substrate 184 for the photodiode has a thickness of 80 microns.

The photodiode formed on the Si substrate 184 and the above-discussed surface emitting laser are stacked and bonded to each other through metal electrodes 174 and 176. The photodiode includes a p-type diffused region 175 and an n-type diffused region 185 formed in the Si substrate 184. The electrode 176 with a window is formed on the p-side through an insulating layer 177, and an overall electrode 178 is formed on the n-side. The surface emitting laser of this embodiment differs from that of the sixth embodiment only in that an active layer 172 has an InGaAs/AlGaAs dual quantum well structure and is sandwiched between semiconductor multi-layer mirrors 171 and 173. This laser emits light that can transmit through the GaAs substrate 130. The p-side electrode 114 is connected through an electrode wiring 180 to a wiring formed on the substrate for supporting the cantilever. In this case, a smoothing layer 183 of polyimide is formed on a stepped end face of the laser to smooth the stepped portion. Further, the n-side electrode 174 is connected to the electrode 176 of the photodiode and connected to an electrode wiring 181 formed on the cantilever through an insulating layer 182. The light attenuating layer 117 is also formed in this embodiment as in the sixth embodiment. Since the n-side electrode 178 of the photodiode is in contact with the thick metal layer 170 of the lever, the lever itself is used as the electrode wiring.

In this embodiment, the n-side electrode 174 of the laser is in contact with the p-side electrode 176 of the photodetector form a common electrode 181. This structure is different from the sixth embodiment, but the driving method is principally the same as that of the sixth embodiment.

(Tenth Embodiment)

Figure 22A:
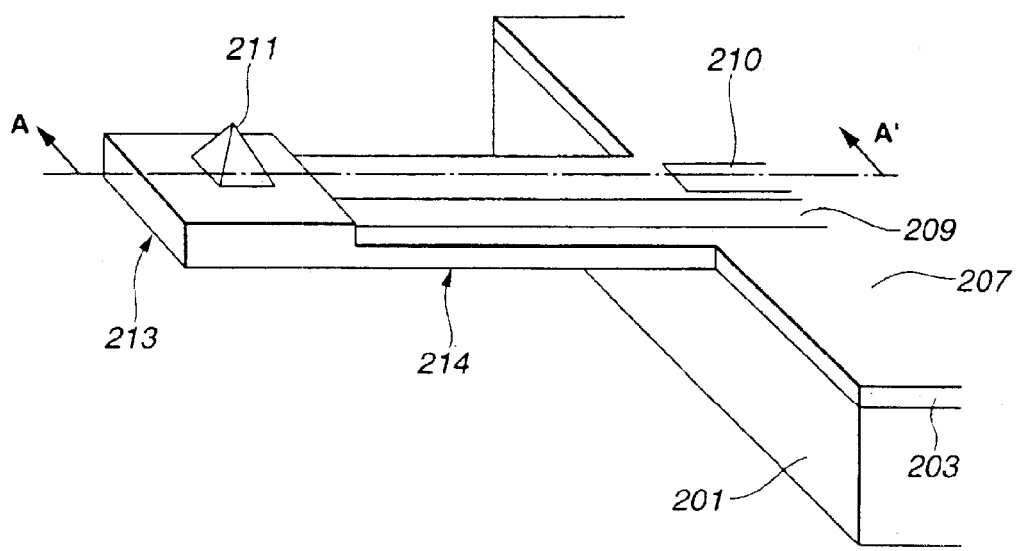
FIG. 22A is a perspective view illustrating a tenth embodiment of a surface-type optical apparatus according to the present invention, which is directed to a light source apparatus for a near-field optical system.
Figure 22B:
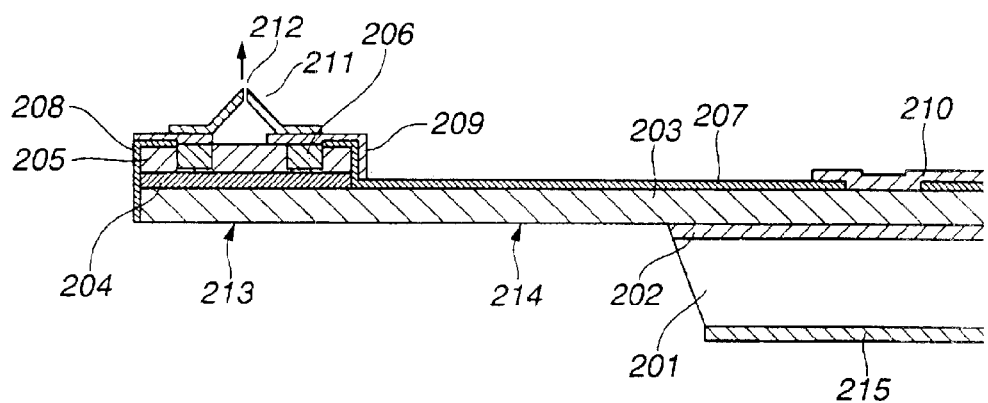
FIG. 22B is a cross-sectional view illustrating the tenth embodiment, taken along a line A–A' of FIG. 22A.

FIGS. 22A and 22B illustrate a tenth embodiment of the SNOM head. The SNOM head of this embodiment includes a surface emitting laser, a protrusion member with a minute opening, which is formed on the epitaxial layer surface of the laser, and a cantilever at a tip of which the laser with the protrusion member is integrally formed.

As illustrated in FIG. 22A (a perspective view) and FIG. 22B (an A–A' cross-sectional view of FIG. 22A), a surface emitting laser 213 used in this embodiment includes a one-wavelength cavity 204 consisting of an AlGaAs/GaAs MQW active layer and an AlGaAs spacer layer, and n-type and p-type DBR mirrors 203 and 205 consisting of multiple (about twenty (20) to thirty(30) pairs) AlAs/AlGaAs layers of a ¼-wavelength thickness and sandwiching the cavity 204. Those layers are epitaxially grown on a semi-insulating GaAs substrate 201 by the MOVPE, for example. An AlAs etch stopping layer 202 for use in etching the GaAs substrate 201 is formed between the n-DBR mirror 203 and the GaAs substrate 201. An uppermost layer of the p-DBR mirror 205 consists of a highly-doped p-GaAs layer (not shown) to obtain an easy electrode contact. To build the current constricting structure in a light radiation region (which has a diameter of 15 microns in this embodiment) of the laser 213, an annual etching is conducted down to the neighborhood of the active layer and the etched annular recess is then buried with a polyimide 206 to flatten the surface.

Insulating layers 207 and 208 of $SiN_1$ or the like are formed, as illustrated in FIGS. 22A and 22B, and a p-side electrode 209 with a window for light emission is laid down on the insulating layers 207 and 208. The p-side electrode 209 consists of Cr/Au, for example. The p-side electrode 209 also acts as a wiring formed on a cantilever 214 through the insulating layer 207, as illustrated in FIG. 22A. On the other hand, an n-side electrode 210 is constructed by taking a contact with an n-AlGaAs layer at a portion of the n-DBR mirror 203. If the contact was taken with an n-AlAs layer of the n-DBR mirror 203, a difference between levels of conduction bands of this n-AlAs layer and the electrode metal would become too large.

A protrusion member 211 of a tetrahedral shape with a minute opening 212 (its diameter is about 100 nm) on its tip is mounted on a light emission surface of the surface emitting laser 213 by the pressure bonding between metals. The protrusion member 211 is formed of an Au foil, for example. Evanescent light leaks through the minute opening 212. The minute protrusion member 211 is used in this embodiment, but in place thereof the entire light emission surface may be covered with an electrode and a minute opening may be formed at its center.

The cantilever 214 for supporting the surface emitting laser 213 is formed, as illustrated in FIGS. 22A and 22B. The n-DBR mirror layer 203 is shaped into a cantilever by etching the p-DBR mirror 205 and the cavity 204 with their tip portions being left. The elastic cantilever 214 is formed as illustrated in FIGS. 22A and 22B by etching the GaAs substrate 201 to make a portion of the lever 214 free. The elastic constant of the lever 214 can be controlled by varying the thickness of the n-DBR mirror 203 and the plane shape of the lever 214.

Figure 26:
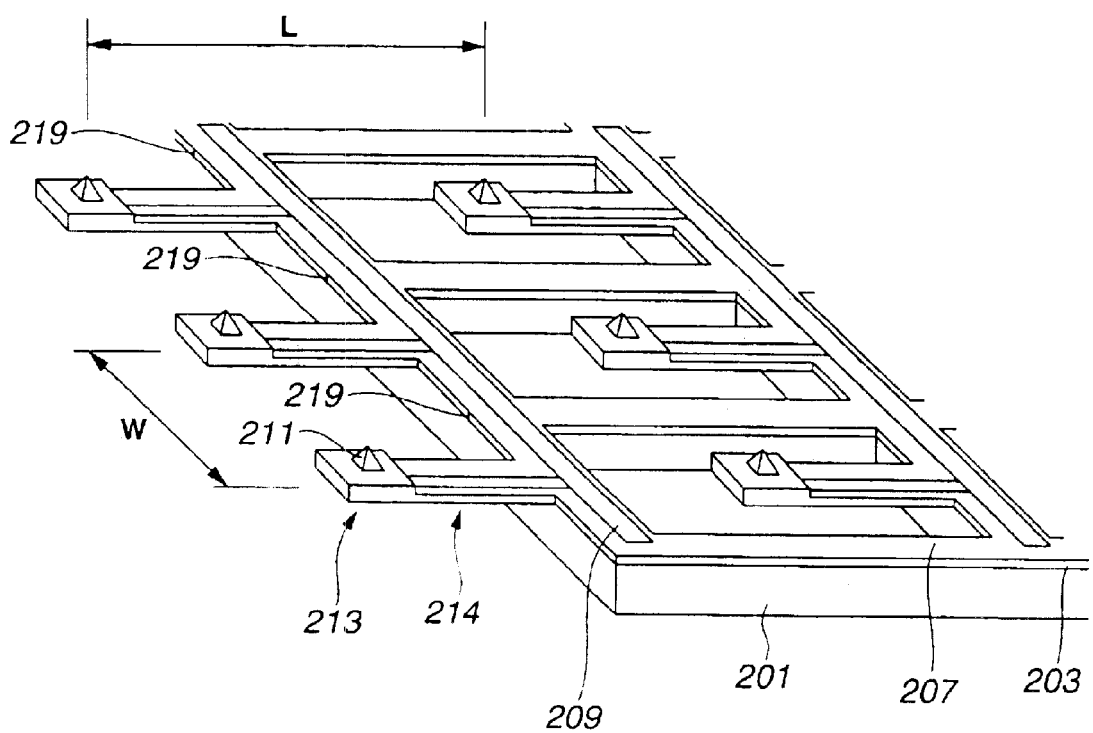
FIG. 26 is a perspective view illustrating a structure in which a plurality of surface-type optical apparatuses according to the present invention are arranged in a two-dimensional array.

In this embodiment, the width, length and thickness of the cantilever 214 (i.e., the n-DBR layer 203) are 50 microns, 100 microns and 2 microns, respectively. The arrangement of an array of those SNOM heads is illustrated in FIG. 26. A lateral interval W between the SNOM heads is set to 100 microns. A longitudinal interval L is set to 500 microns due to the length of the cantilever 214 and a supporting portion of the substrate 201. Though the n-side electrode is not shown in FIG. 26, the matrix wiring is formed under the insulating layer 207 by separating the n-DBR mirror layer 203 by etching, and the electrode is drawn out at the edge of the substrate 201. This separation is achieved by grooves 219 illustrated in FIG. 26. The separation groove 219 extends in a column direction in contrast to the p-side electrodes 209 connected in a row direction and makes common the n-side electrodes 210 of the surface emitting lasers 213 arranged in the column direction.

In this multiple arrangement, a current injection into the lasers 213 is performed by the matrix wiring, as illustrated in FIG. 26, but a wiring for independently driving those lasers 213 may be adopted likewise. In this case, the n-side electrodes 203 are made common, and only the p-side electrodes 206 are connected in an independent form. Here, when the growth substrate 201 for the laser 213 is composed of an n-substrate, the n-side electrode can be taken from the bottom surface of the substrate 201 as a common electrode (see an electrode 215 in FIG. 22B). In this case, the electrode 210 illustrated in FIGS. 22A and 228 is unnecessary.

The fabrication process of the SNOM head of this embodiment will be described with reference to FIGS. 27A through 27D which are cross-sectional views taken along a line A–A' of FIG. 22A.

Figure 27A:
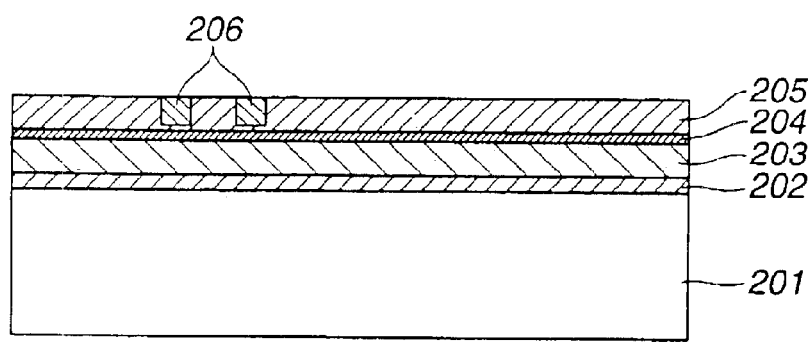
FIGS. 27A–27D are cross-sectional views illustrating fabrication steps of a fabrication method for the tenth embodiment.

As illustrated in FIG. 27A, the n-AlAs etch stopping layer 202 with a thickness of 0.1 micron, the n-type AlAs/AlGaAs DBR mirror 203, the one-wavelength cavity 204 consisting of the AlGaAs/GaAs MQW active layer and the AlGaAs spacer layer, the p-type AlAs/AlGaAs DBR mirror 205 and the p-GaAs contact layer are epitaxially grown on the semi-insulating GaAs substrate 201 by the MOVPE, for example. Then, in a region where the surface emitting laser 213 is to be fabricated, an annual etching is conducted down to the neighborhood of the active layer 204 by photolithography and RIE of $Cl_2$ gas, and the etched annular recess is buried with the polyimide 206 to flatten the surface. Its inner diameter and outer diameter are 15 microns and 30 microns, respectively.

Figure 27B:
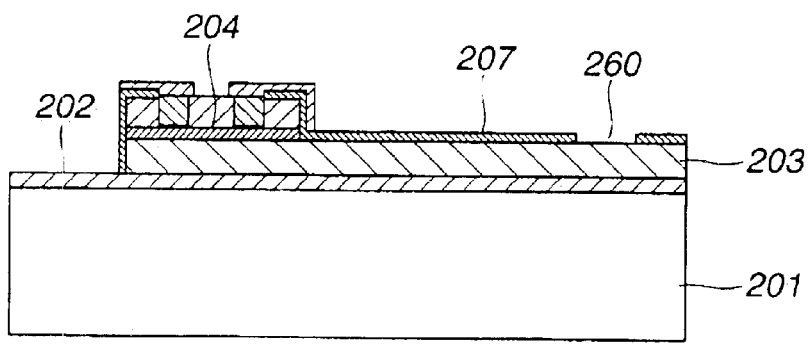

As illustrated in FIG. 27B, another etching of the grown layers is conducted by photolithography and RIE of $Cl_2$ gas until the AlAs layer 202 is exposed to form the shape of the cantilever. Here, in order to enhance control over the etching depth, the RIE etching may be stopped right before the AlAs layer 202 is exposed, and a selective wet etching using a solution mixture of sulfuric acid and hydrogen peroxide solution may be conducted to stop the etching precisely at the AlAs. Further, in a portion other than the laser region at the tip of the cantilever, the p-DBR layer 205 and the cavity 204 are similarly etched. If necessary, the n-DBR 203 is further etched at its predetermined location to form the pattern of the matrix wiring (see the description of FIG. 26).

Then, after the insulating layer 207 of SiN$_x$ is formed, only its regions for taking the electrode contact and for removing the GaAs substrate 201 are removed by photolithography and RIE of CF$_4$. In a window 260 for taking the electrode contact at the n-side, the AlAs layer is selectively etched using hydrochloric acid to expose AlGaAs, since when the etching control of RIE is used, it is difficult to determine whether AlAs or AlGaAs is exposed on an uppermost surface of the n-DBR mirror layer 203, because of low mole fraction of Al.

Figure 27C:
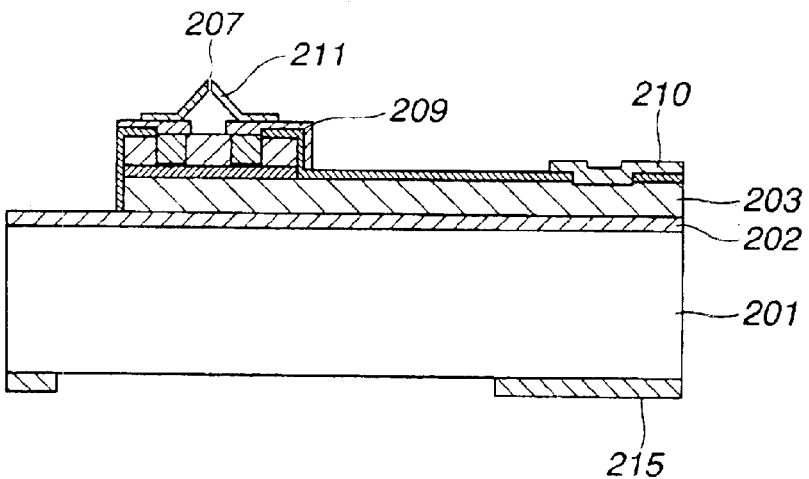

As illustrated in FIG. 27C, the p-side electrode 209 with a window for taking light and the n-side electrode 210 are formed by the lift-off or the like. Then, the protrusion member 211 with the minute opening 212 is aligned with and bonded to the laser by the pressure bonding. The fabrication method of the protrusion member 211 is described in the first embodiment.

Figure 27D:
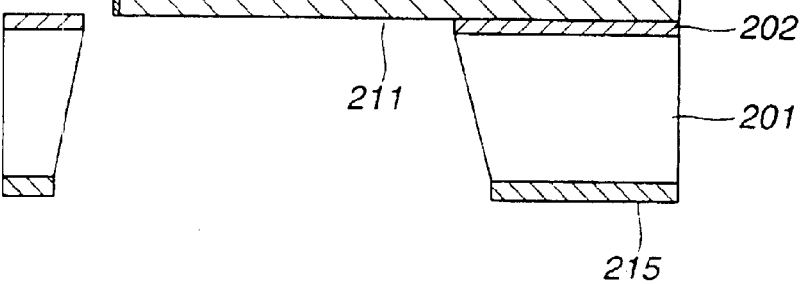

Then, a polyimide layer is spin-coated on the bottom surface of the substrate to form a protective layer. If necessary, the bottom surface of the GaAs substrate 201 can be polished. After that, the metal pattern 215, acting as a mask for hole-etching the substrate 201, is formed by the lift-off or the like. Where the n-side electrode need not be separated as discussed above, the GaAs substrate 201 may be composed of an n-type substrate and the metal pattern 215 itself may be used as the n-side electrode As As illustrated in FIG. 27D, after the GaAs substrate 201 is etched with the metal 215 being used as the etching mask by using a liquid mixture of hydrogen peroxide solution and ammonia heated to 40° C., the AlAs etch stopping layer 202 is removed by using hydrochloric acid. Finally, the above surface protective layer is removed by RIE of hydrogen plasma, and the cantilever-type SNOM head is thus completed.

The driving method of the SNOM head of this embodiment will be described. When the head is simply used as a near-field optical microscope, the surface emitting laser is oscillated by the apparatus of this embodiment to apply evanescent light to the surface of a medium and its scattered light is detected by another optical system. In this case, the optical system becomes large in size and its S/N cannot be large. To solve this disadvantage, there is a method in which the surface emitting laser is used as the photodetector as well. When a current injected into the laser is lowered to about its threshold current, the oscillation condition of the laser changes depending on the reflectivity of the medium. The above-described method uses this phenomenon. When the reflectivity of the evanescent light on the medium surface varies and the amount of light returning to the laser changes, the oscillation condition of the laser is largely changed. When the returning light increases in the vicinity of the threshold current, the condition of the laser becomes unstable and a vibration depending on a delay time of the returning light occurs. At this time, the light amount of the laser vibrates. At the same time, the current injected into the laser also vibrates. Therefore, optical information can be read when the DC component of the current injected into the laser through the electrode is cut and its signal component is taken. The signal can also be detected from the variation of the oscillated light when the light emerging from the side of the GaAs substrate 201 is monitored by another photodetector.

In the SNOM head of this embodiment, the protrusion member 211 is electrically connected to the p-side electrode 209 of the laser 204. As a result, where a voltage difference exists between the protrusion member 211 and the medium surface, the laser 204 tends to be unstable due to a tunnel current and the like. In such a case, the insulating layer may be provided between the p-side electrode 209 and the protrusion member 211 to block the above electric connection. Further, light might laterally propagate from the surface emitting laser 213 and emerge at the end surface of the tip of the cantilever 214. Where this light causes adverse influence of an optical noise, a metal or dielectric reflective layer 208 may be formed on this end surface.

Figure 25:
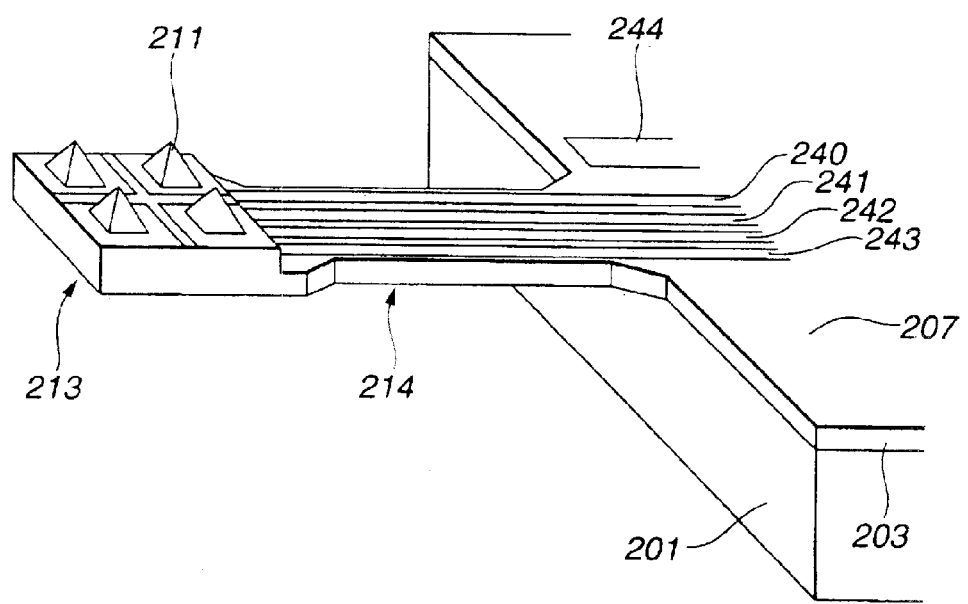
FIG. 25 is a perspective view illustrating a structure in which a plurality of surface-type optical apparatuses according to the present invention are placed on a cantilever.

In the above structure, one surface emitting laser 213 is provided on one cantilever 214. However, as illustrated in FIG. 25, a plurality of surface emitting lasers 213 and a plurality of protrusion members 211 with the minute opening can be provided on the cantilever 214. In the structure illustrated in FIG. 25, a two-dimensional (2×2) array of the lasers 213 are placed at intervals of 50 microns, the protrusion members 211 are bonded to light emission surfaces of the respective lasers 213, and the thus-formed SNOM heads are mounted on the cantilever 214. The electrode wiring to each surface emitting laser 213 is formed in such a manner that a common electrode 244 drawn from each n-DBR 203 is formed as the n-side electrode and four p-side electrodes 240 to 243 are independently drawn from the four lasers 213. The four lasers 213 can be thus driven independently. In this structure, the width of the lever tip is set to 100 microns to 6 accommodate the four lasers 213, but the width of the lever 214 at its inner region is thinned to 50 microns, as illustrated in FIG. 25, to reduce its elastic force.

The above structure is applicable to a scanning at fine pitches and high-speed operation. Further, all the devices need not be used as SNOM light sources, and a part thereof may be replaced by a photodetector and used only as a detector, or as a light source for tracking.

Also in this embodiment, a highly-effective small SNOM head, which can flexibly follow and trace the medium surface, can be readily fabricated. Using this head, image observation with a super-high resolving power, optical recording, optical exposure and the like can be performed.

The surface emitting laser and the cantilever are not limited to the above-discussed ones, as described in the first embodiment.

(Eleventh Embodiment)

Figure 23:
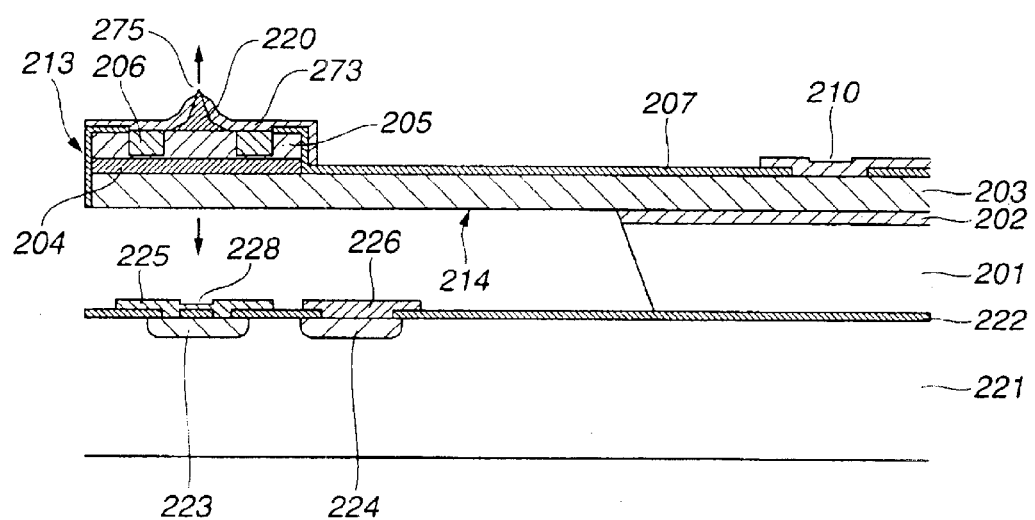
FIG. 23 is a cross-sectional view illustrating an eleventh embodiment of a surface-type optical apparatus according to the present invention, which is directed to a light source apparatus for a near-field optical system.

An eleventh embodiment is directed to a structure in which a tip-sharpened layer structure is fabricated by etching grown layers 220 as illustrated in FIG. 23, and after an electrode 273 is formed thereon, a minute aperture 275 is formed by removing only its tip during a self-alignment process. Further, a photodiode for monitoring light emitted from the substrate side of the semiconductor laser 213 is formed on an Si substrate 221, and the substrate 221 is aligned with and bonded to the GaAs substrate 201 of the SNOM head. Thus, the optical detecting system is also integrated. In FIG. 23, portions having the same functions as those of the tenth embodiment are designated by the same reference numerals as those in FIGS. 22A and 22B.

In that photodetector, after n-diffused layer 223 and p-diffused layer 224 are formed in the undoped Si substrate 221 and an insulating layer 222 of SiN, or the like is formed thereon, electrode wiring patterns 225 and 226 are formed. The wiring of the photodetectors is formed in a matrix or independent pattern, corresponding to the SNOM heads.

Here, the thickness of the substrate 201 supporting the CT cantilever 214 is reduced to about 150 microns by polishing. Therefore, when the emission angle of the surface emitting laser 213 is about ten (10) degrees of a solid angle and the window diameter of the output end is 10 microns, the beam diameter on the light receiving surface of the photodetector is about 40 microns. A window region 228 of the light receiving surface is hence set to about 100 microns to achieve sufficient detection. The photodiode is composed of a pin-PD structure in this embodiment, but other structures, such as APD, MSM-PD or FET-PD, can also be used.

The fabrication method of the minute aperture 275 during the self-alignment process will be described with reference to FIGS. 28A to 28D.

Figure 28A:
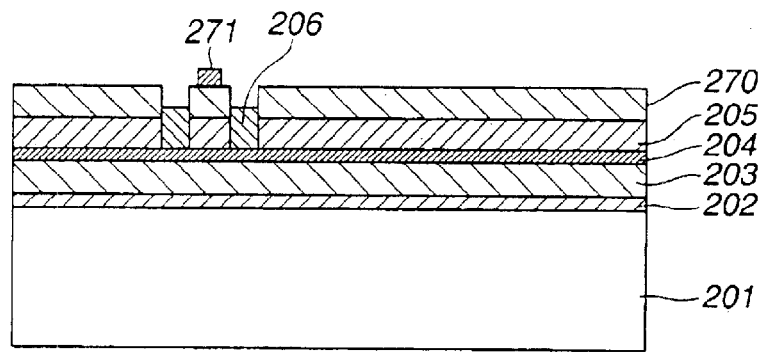
FIGS. 28A–28D are cross-sectional views illustrating fabrication steps of a fabrication method for the eleventh embodiment.

As illustrated in FIG. 28A, a p-Al$_{0.3}$GaO$_{0.7}$As layer 270 with a thickness of 1.5 microns is consecutively grown on the laser layers 203 to 205 of the tenth embodiment formed on the GaAs substrate 201. An annual etching is performed, and the etched groove is buried with the polyimide 206 as in the tenth embodiment. Here, an uppermost surface of the polyimide layer 206 is set back down to the neighborhood of the uppermost surface of the p-DBR mirror 205 by overetching. A photoresist 271 with a diameter of 3 microns is then deposited at a central portion of the light radiating region of the surface emitting laser 213 by using photolithography.

Figure 28B:
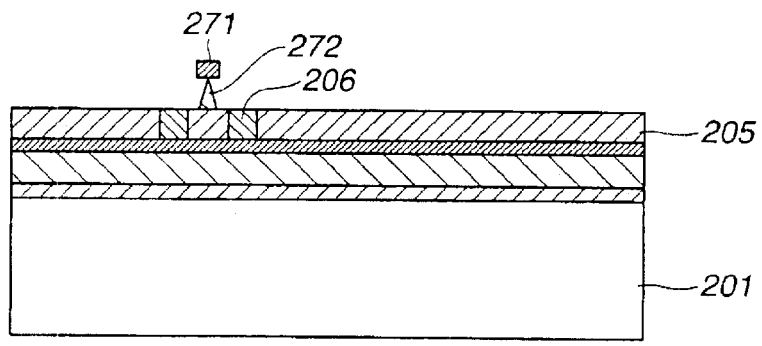

As illustrated in FIG. 28B, when the AlGaAs layer 270 is wet-etched using a mixture of sulfuric acid and hydrogen peroxide solution, the AlGaAs layer 270 is etched in both the longitudinal and lateral directions. The layer 270 right below the photoresist 271 is etched most deeply, so a sharpened protruding portion 272 is formed. The photoresist 271 may also be pealed. The etching is stopped when the uppermost GaAs layer of the p-DBR mirror 205 is exposed. The polyimide 206 is flattened by etching. The time-stopping stopping of the etching can be precisely controlled by observing an interference color of the surface.

Figure 28C:
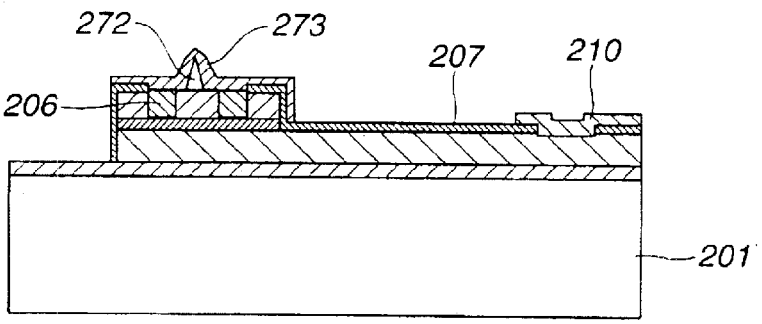

As illustrated in FIG. 28C, the SiN layer 207 and the electrode 273 are formed similarly to the tenth embodiment. Here, the p-side electrode 273 is also formed on the minute protruding portion 272.

Figure 28D:
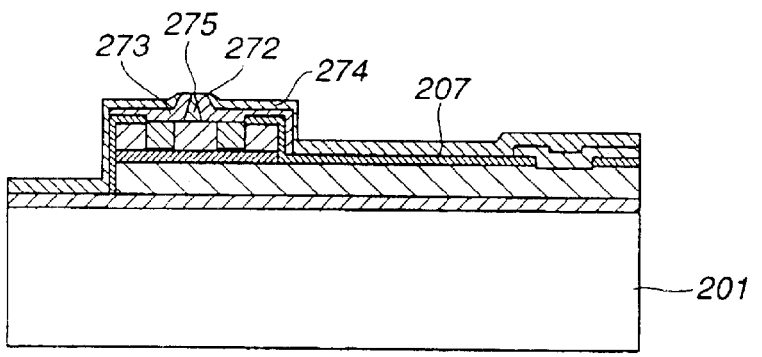

As illustrated in FIG. 28D, a photoresist 274 is laid down over the entire surface, and the surface is slightly etched by RIE using oxygen gas. Since the thickness of the photoresist 274 on the tip of the protruding portion 272 is small, only the photoresist 274 on the tip can be removed in a self-alignment manner. Then, the minute aperture 275 can be formed when only the tip portion of the electrode 273 is etched with the thus-formed photoresist 274 used as a mask, by ion-milling using Ar gas.

Other processes are the same as those of the tenth embodiment. The SNOM head of this embodiment can be driven by the same method as described with reference to FIG. 21. The STM operation or the AFM observation can be utilized-as well.

In the eleventh embodiment, there is no problem of yield that occurs when the minute protrusion member is bonded by pressure. Therefore, the SNOM head with a high productivity can be provided. Further, since the photodetector is integrated with the laser, a compact and light SNOM head apparatus can be provided even when the heads are arrayed. In this embodiment, the photodiode is formed on another substrate 221 and the substrates 201 and 221 are bonded to each other. Another structure, however, can be adopted in which an AlGaAs/GaAs pin structure of a photodetector is grown on a surface below the surface emitting laser 213, and the laser and the photodetector are integrated on the cantilever tip. Still another structure can be adopted, in which a thin portion of the substrate 201, illustrated in FIGS. 22A and 22B, is left right under the surface emitting laser 213, a photodetector is formed by the impurity doping therein, and the electrode wiring thereto is appropriately formed on a portion whereat the insulating layer is formed.

(Twelfth Embodiment)

Figure 24A:
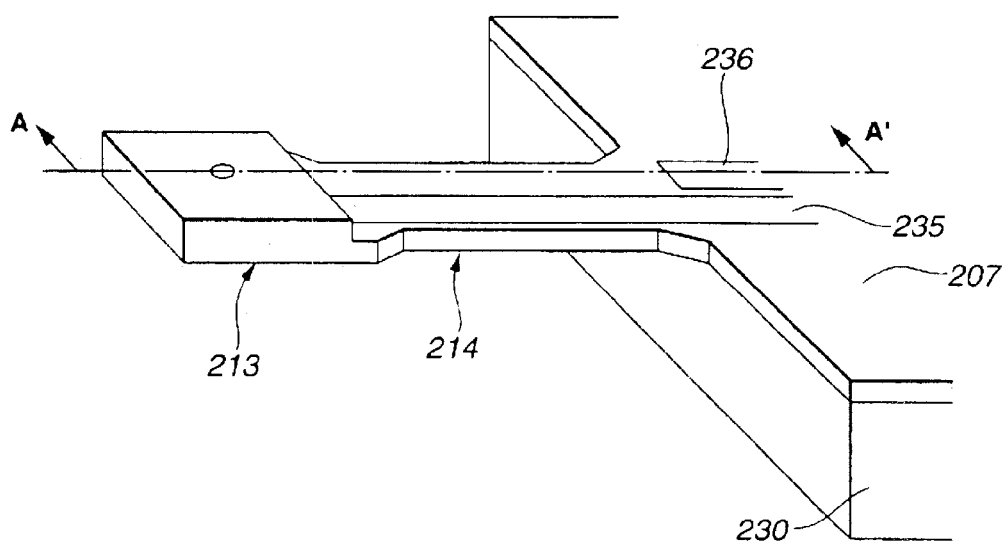
FIG. 24A is a perspective view illustrating a twelfth embodiment of a surface-type optical apparatus according to the present invention, which is directed to a light source apparatus for a near-field optical system.
Figure 24B:
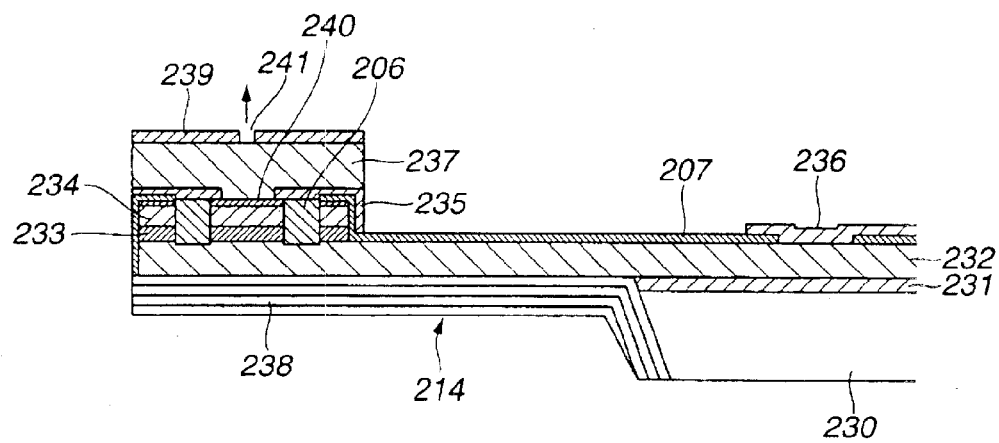
FIG. 24B is a cross-sectional view illustrating the twelfth embodiment, taken along a line A–A' of FIG. 24A.

A twelfth embodiment is directed to a structure in which a surface emitting laser of a GaN series for radiating light at 380 to 420 nm (from ultraviolet light to blue light) is used. This is suitably used in an optical information recording apparatus or an exposure apparatus. In FIGS. 24A and 24B, portions having the same functions as those of the tenth embodiment are designated by the same reference numerals as those in FIGS. 22A and 22B.

The structure of the twelfth embodiment will be described with reference to FIGS. 24A and 24B. An AlN lowtemperature buffer layer 231 with a thickness of 1 micron, which is grown at low temperature (about 500° C.), a cladding layer 232 of n-GaN/AlGaN with a thickness of 0.3 microns, an undoped MQW active layer 233 of InGaN/AlGaN, a cladding layer 234 of p-AlGaN/GaN with a thickness of 0.5 microns, and a GaN contact layer 240 with a thickness of 0.05 microns are grown on a sapphire substrate 230 by the MOCVD or the like. Further, dielectric mirrors 237 and 238 of SiO$_2$/MgO are deposited to complete the surface emitting laser.

A Ti/Al/Au is formed on the cladding layer 232 of n-GaN/AlGaN as an n-side electrode 236, and an Ni/Au with an opening is formed on the p-GaN contact layer 240 as a p-side electrode 235. The insulating layer 207 is formed where necessary. In this embodiment, after a light blocking layer 239 of Au or the like is formed on the dielectric mirror 237, a minute opening 241 is formed by etching. The opening 241 may be formed in such a manner as described in the tenth or eleventh embodiment.

In this embodiment, the sapphire substrate 230 is etched until the buffer layer 231 is exposed by, RIE using SF$_6$ gas or the like, and the flat cladding layer 232 is exposed by the wet etching using phosphoric acid heated to 300° C. At this time, selective etching is possible because there is a difference in the etching rate between the amorphos buffer layer 231 and the cladding layer 232 of single crystal. Since the dielectric mirror 238 is formed on the exposed cladding layer 232, the lever 214 consists of a layer structure of the cladding layer 232 and the dielectric mirror 238.

In the twelfth embodiment, the sapphire substrate 230 is used, but an SiC substrate or a GaN substrate may also be used. In the SNOM head according to this embodiment, ultraviolet light having a high optical energy can be used. Therefore, when the head is applied to the apparatus for performing information recording or optical exposure, information writing can be effectively achieved. Further, the fabrication is easy since the dielectric mirrors 237 and 238 are used.

Meanwhile, in the above first to twelfth embodiments, the cantilever is used as a simple elastic supporter. The following structure, however, can be used. A piezoelectric resister is formed to detect the amount of deflection of the cantilever, and a bimorphic structure is fabricated such that the lever body can be driven upward or downward by the electric field. In this structure, the minute opening can be adjustably and accurately positioned relatively to the medium surface, for example.

(Thirteenth Embodiment)

Figure 29:
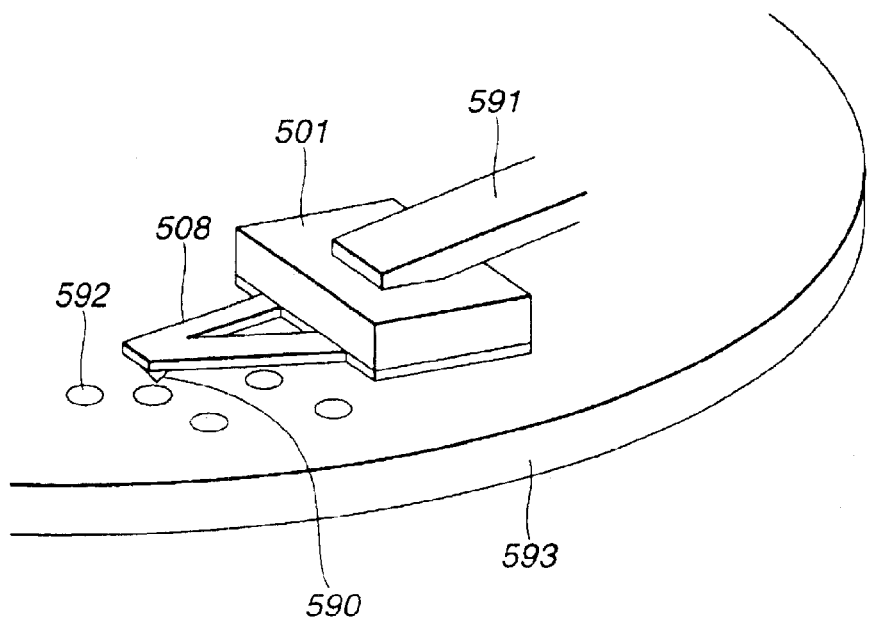
FIG. 29 is a perspective view illustrating an optical information recording apparatus using a surface-type optical apparatus according to the present invention.

In a thirteenth embodiment, an SNOM head 590 designed according to the present invention is used in an optical information recording apparatus, as illustrated in FIG. 29.

As illustrated in FIG. 29, the SNOM head 590 with an integrally-formed minute opening member and surface emitting laser is mounted on a tip of a cantilever 508 (here, having a trapezoidal shape with its central portion is cut away) supported by a substrate 501 of semiconductor or the like. The substrate 501 is in turn supported by a supporting arm 591. Modulated evanescent light generated by the SNOM head 590 interacts with phase-change recording medium formed on a disc 593 to form an optically-recorded domain 592.

When the information is to be reproduced, a current injected into the surface emitting laser in the head 590 is decreased to about its threshold current. Then, the oscillation condition of the laser varies in accordance with the reflectivity of the medium, and therefore the information is reproduced by using this phenomenon. Where the optically-recorded domain 592 exists, the interaction between evanescent light and recording medium changes to alter the amount of returning light to the laser. The oscillation condition of the laser is hence largely varied. When the returning light increases in the vicinity of the threshold current, the condition of the laser becomes unstable and an optical vibration depending on a delay time of the returning light occurs. Therefore, the recorded information can be read by detecting this output variation with an integrally-arranged photodetector.

When optical recording is performed by such an SNOM head 590 with the minute opening having a diameter of several tens of nanometers, it is possible to attain a recording density of more than 100 Gb/in$^2$. In a recording apparatus using a conventional SNOM head, it is hard to make the apparatus compact in size and obtain the arrayed structure. Therefore, a high-speed operation is difficult to achieve. In contrast thereto, in an apparatus of the present invention, a compact arrayed structure can be readily constructed, and therefore a high-speed access is possible. Though only one SNOM head 590 is illustrated in FIG. 29, a multi-probe as illustrated in FIG. 9, 11, 16, 17, 25 or 26 may also be used.

In this embodiment, the disc-type rotating system is used as illustrated in FIG. 29. Other systems, such as a two-dimensional translational displacement system, can also be used in place of the disc-type rotating system.

Similar to the above, a super-fine optical exposure with a near-field optical system can be constructed by using an SNOM head of the present invention. An optically-exposed pattern can be formed on a photoresist deposited on a substrate surface when the SNOM head array of the present invention is scanned two-dimensionally. Since an ordinary photoresist for a fine pattern is sensitive chiefly to ultraviolet light, it is preferable to use a light source made of ultraviolet material, such as GaN series, as described in the twelfth embodiment. However, the optical exposure may be performed using a medium sensitive to infrared light since the most effective high-power surface emitting laser is presently a laser of GaAs series for infrared light. In a conventional SNOM head, it takes a very long time to form the exposed pattern since a high-density arraying is difficult. In contrast, the time can be drastically shortened in the apparatus of the present invention.

In the above embodiments, the light source for the near-field optical system is provided with a minute opening. However, an apparatus without a minute opening, which emits light in an ordinary radiation mode, can also be applied to a recording reproducing apparatus, an optical exposure apparatus or the like. Since the radiation angle of a surface emitting laser is very small, for example, several degrees, its radiation light can be used as it is. Alternatively, a light beam form the laser can be converged on the medium surface by bonding a microlens or the like on the light emission surface of the laser. In this case, light power can be strengthened, so that the apparatus is also applicable, for example, to an optical pincette in which a fine particle, such as an atom or a molecule, is trapped by light and the trapped particle is moved to a desired position.

In the above embodiments, the surface-type optical device is mounted on the elastic supporter. The surface-type optical device, however, can be used only with the minute opening, but without the elastic supporter.

As described in the foregoing, according to the present invention, a compact light source apparatus with a high energy conversion efficiency for use in a near-field optical system, a compact light source apparatus with an optical device mounted on an elastic supporter capable of flexibly and accurately scanning a medium surface, a compact light source apparatus with plural SNOM heads capable of flexibly and accurately scanning a medium surface at a high speed, a compact light source apparatus with integrated light introducing device and photodetector capable of flexibly and accurately scanning a medium surface and suitable for use in a near-field optical system, and so forth can be provided and readily fabricated.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A surface optical apparatus comprising:

a surface light emitting device;

a substrate for supporting a light device; and a photodetector to detect output light from the surface light emitting device, wherein the surface light emitting device includes a protrusion with an opening placed on a light emitting region of said surface light emitting device and wherein the surface light emitting device and the photodetector are stacked on the substrate.

2. A surface optical apparatus according to claim 1, wherein evanescent light leaks from the opening.

3. A surface optical apparatus according to claim 1, wherein the size of the opening is less than 100 nm.

4. A surface optical apparatus according to claim 1, wherein the shape of the protrusion is a quadrangle pyramid.

5. A surface optical apparatus according to claim 1, wherein said surface light emitting device is supported by said substrate through an elastic supporter.

6. A surface optical apparatus according to claim 1, wherein said surface light emitting device comprises a surface emitting semiconductor laser.

7. A surface optical apparatus according to claim 6, wherein the surface emitting semiconductor laser includes at least one of a layer of GaAs, a layer of AlGaAs and a layer of InGaAs.

8. A surface optical apparatus according to claim 6, wherein the surface emitting semiconductor laser includes at least one of a layer of GaN, a layer of AlGaN and a layer of InGaN.

9. A surface optical apparatus according to claim 1, wherein said surface light emitting device comprises thin semiconductor layers grown on another substrate, and said another substrate is mounted on said substrate.

10. A surface optical apparatus comprising:

a supporter;

a surface light emitting device on the supporter;

an electrode connected to the surface light emitting device; and a photodetector to detect output light from the surface light emitting device, wherein the surface light emitting device includes a protrusion with an opening placed on a light emitting region of said surface light emitting device, and wherein said surface light emitting device, the electrode and the photodetector are stacked on the supporter.

11. A surface optical apparatus according to claim 10, wherein said supporter is shaped into a cantilever.

12. A surface optical apparatus according to claim 10, wherein said supporter is shaped as a trapezoidal cantilever whose central portion is removed.

13. A surface optical apparatus according to claim 10, wherein said surface light emitting device comprises a surface emitting semiconductor laser.

14. A surface optical apparatus according to claim 13, wherein the surface emitting semiconductor laser includes at least one of a layer of GaAs, a layer of AlGaAs and a layer of InGaAs.

15. A surface optical apparatus according to claim 13, wherein the surface emitting semiconductor laser includes at least one of a layer of GaN, a layer of AlGaN and a layer of InGaN.

16. A surface optical apparatus comprising:

a surface light emitting device; and a substrate for supporting the surface light emitting device, wherein the surface light emitting device includes a protrusion with an opening placed on a light emitting region of the surface light emitting device, and wherein the surface light emitting device is bonded to the substrate.

* * * * *

UNITED STATES PATENT AND TRADEMARK OFFICE
CERTIFICATE OF CORRECTION

PATENT NO. : 6,852,968 B1
DATED : February 8, 2005
INVENTOR(S) : Toshihiko Ouchi et al.

It is certified that error appears in the above-identified patent and that said Letters Patent is hereby corrected as shown below:

Title page,
Item [30], Foreign Application Priority Data,
"11/059533           -- 11-059533
 11/059535     should read     11-059535
 11/059541"                    11-059541 --.

Column 3,
Line 28, the space after "removed." should be deleted.
Line 29, "¶ Thus," should read -- removed. Thus, --.

Column 5,
Line 3, "<n-side" should read -- n-side --.
Line 60, "substrate-can" should read -- substrate can --.

Column 6,
Line 49, "supporter-as" should read -- supporter as --.

Column 7,
Line 4, "also-directed" should read -- also directed --.

Column 14,
Line 12, "$SiN_1$" should read -- $SiN_x$ --.

Column 15,
Line 18, "of." should read -- of --.
Line 61, the space after "used." should be deleted.
Line 62, "¶ Further," should read -- Further, --.

Column 16,
Lines 45 and 50, "SiN" should read -- $SiN_x$ --.

Column 18,
Line 25, "groove." should read -- groove --.

Column 21,
Line 10, "n-diffused" should read -- $n^+$-diffused --.
Line 22, "200 A" should read -- 200 Å --.
Line 63, "p-doped" should read -- $p^+$-doped --.

UNITED STATES PATENT AND TRADEMARK OFFICE
CERTIFICATE OF CORRECTION

PATENT NO. : 6,852,968 B1
DATED : February 8, 2005
INVENTOR(S) : Toshihiko Ouchi et al.

It is certified that error appears in the above-identified patent and that said Letters Patent is hereby corrected as shown below:

Column 22,
Line 58, "SiN," should read -- $SiN_y$ --.

Column 24,
Line 19, "Cz 15" should be deleted.

Column 25,
Line 32, "SiN" should read -- $SiN_x$ --.
Line 54, "30º" should read -- 30% --.

Column 29,
Line 26, "electrode As," should read -- electrode. --.

Column 31,
Line 10, "p-Al $_{0.3}$GaO$_{0.7}$As" should read -- p-Al$_{0.3}$Ga$_{0.7}$As --.
Line 33, "SiN" should read -- $SiN_x$ --.

Signed and Sealed this

First Day of November, 2005

JON W. DUDAS
*Director of the United States Patent and Trademark Office*